(12) United States Patent
Mass et al.

(10) Patent No.: US 9,745,087 B2
(45) Date of Patent: Aug. 29, 2017

(54) METHOD AND APPARATUS FOR SECURING BALED ITEMS

(71) Applicant: Tama Plastic Industry, Ha' Emek (IL)

(72) Inventors: Nissim Mass, Ha' Emek (IL); Tsafrir Lior, Ha' Emek (IL); Matan Inbar, Ha' Emek (IL)

(73) Assignee: Tama Plastic Industry (IL)

( * ) Notice: Subject to any disclaimer, the term of this patent is extended or adjusted under 35 U.S.C. 154(b) by 730 days.

(21) Appl. No.: 13/734,428

(22) Filed: Jan. 4, 2013

(65) Prior Publication Data

US 2014/0190127 A1 Jul. 10, 2014

(51) Int. Cl.
| | |
|---|---|
| *B65B 11/00* | (2006.01) |
| *B65B 13/32* | (2006.01) |
| *B65B 27/12* | (2006.01) |
| *A01F 15/07* | (2006.01) |
| *B65B 11/04* | (2006.01) |
| *B65B 51/24* | (2006.01) |

(Continued)

(52) U.S. Cl.
CPC ............ *B65B 11/00* (2013.01); *A01F 15/071* (2013.01); *B65B 13/32* (2013.01); *B65B 27/12* (2013.01); *B65B 11/04* (2013.01); *B65B 11/10* (2013.01); *B65B 11/20* (2013.01); *B65B 11/56* (2013.01); *B65B 51/10* (2013.01); *B65B 51/12* (2013.01); *B65B 51/14* (2013.01); *B65B 51/22* (2013.01); *B65B 51/24* (2013.01); *B65B 51/26* (2013.01); *B65B 51/30* (2013.01)

(58) Field of Classification Search
CPC ............... A01F 15/071; A01F 15/715; A01F 2015/0785; B65B 51/24; B65B 51/26; B65B 9/06; B65B 11/04; B65B 11/10; B65B 11/20; B65B 11/30; B65B 11/40; B65B 11/46; B65B 11/48; B65B 11/50; B65B 13/32; B65B 25/146; B65B 51/10; B65B 51/14; B65B 51/22; B65B 51/30; B65B 49/18; B65B 49/34; B65B 11/56; B29C 66/43; B29C 66/436; B32B 37/0084
USPC ... 53/461, 477, 509, 203, 375.9, 329.2, 211, 53/276; 156/290, 133, 70, 583.91; 56/216, 587, 375.8, 376.2
See application file for complete search history.

(56) References Cited

U.S. PATENT DOCUMENTS

| 2,322,298 A | * | 6/1943 | Johnston ........................ 156/555 |
| 2,545,243 A | * | 3/1951 | Rumsey, Jr. ................... 206/497 |

(Continued)

FOREIGN PATENT DOCUMENTS

| WO | 9904613 A1 | 2/1999 |
| WO | 2007063351 A2 | 6/2007 |

OTHER PUBLICATIONS

International Search Report and Written Opinion for Application No. PCT/IL2013/050319 dated Jul. 25, 2013.

*Primary Examiner* — Hemant M Desai
*Assistant Examiner* — Eduardo R Ferrero
(74) *Attorney, Agent, or Firm* — Lerner, David, Littenberg, Krumholz & Mentlik, LLP

(57) ABSTRACT

One embodiment of the present invention includes an apparatus for securing a wrapping material around an item, such as a baled agricultural item, the apparatus including a main plate and at least one projection, the projection including a heating element and a height adjustment mechanism, wherein the height adjustment mechanism controls a force applied to the wrapping material by the projection and provides a force for moving the projection.

21 Claims, 20 Drawing Sheets

(51) Int. Cl.
*B65B 11/20* (2006.01)
*B65B 51/26* (2006.01)
*B65B 51/22* (2006.01)
*B65B 11/56* (2006.01)
*B65B 51/30* (2006.01)
*B65B 51/14* (2006.01)
*B65B 51/10* (2006.01)
*B65B 11/10* (2006.01)
*B65B 51/12* (2006.01)

(56) References Cited

U.S. PATENT DOCUMENTS

| | | | |
|---|---|---|---|
| 2,915,413 A | 12/1959 | Ragan et al. | |
| 3,044,532 A * | 7/1962 | Ghisoni | B31C 1/00 156/351 |
| 3,227,597 A * | 1/1966 | Wilson | B29C 65/18 156/583.3 |
| 3,325,331 A * | 6/1967 | Schwanekamp et al. | 156/290 |
| 3,447,676 A * | 6/1969 | Piroutek | 206/445 |
| 3,867,806 A * | 2/1975 | Lancaster et al. | 53/441 |
| 3,868,291 A * | 2/1975 | Benz et al. | 156/515 |
| 3,874,146 A * | 4/1975 | Watkins | 53/554 |
| 3,912,575 A * | 10/1975 | Zelnick | B29C 65/223 156/515 |
| 3,935,057 A * | 1/1976 | Gray | B65B 51/026 118/248 |
| 3,942,298 A * | 3/1976 | Matzinger et al. | 53/409 |
| 3,951,050 A * | 4/1976 | Poole | B29C 53/48 156/203 |
| 3,996,403 A * | 12/1976 | Gould et al. | 428/198 |
| 4,050,221 A * | 9/1977 | Lancaster et al. | 53/211 |
| 4,062,718 A * | 12/1977 | Hay, II | 156/498 |
| 4,070,513 A * | 1/1978 | Rhoads | B29C 63/426 156/290 |
| 4,084,999 A * | 4/1978 | Rucker | B29C 53/52 138/151 |
| 4,098,052 A * | 7/1978 | Singer | 53/463 |
| 4,102,111 A * | 7/1978 | Nack et al. | 53/552 |
| 4,144,696 A * | 3/1979 | Gustavsson | B65B 53/02 53/442 |
| 4,209,958 A * | 7/1980 | Bailey | 53/553 |
| 4,214,029 A | 7/1980 | Barnes | |
| 4,218,863 A * | 8/1980 | Howard et al. | 53/547 |
| 4,380,484 A * | 4/1983 | Repik et al. | 156/251 |
| 4,473,432 A | 9/1984 | Leader et al. | |
| 4,484,679 A * | 11/1984 | Liekens et al. | 206/303 |
| 4,490,962 A * | 1/1985 | Weis et al. | 53/550 |
| 4,551,965 A * | 11/1985 | Prottengeier | 53/463 |
| 4,555,296 A * | 11/1985 | Burtch | B29C 65/02 156/218 |
| 4,565,728 A | 1/1986 | Gray et al. | |
| 4,651,500 A * | 3/1987 | Chaffey | B65B 25/146 269/269 |
| 5,058,361 A * | 10/1991 | Schmacher | 53/370.9 |
| 5,067,612 A * | 11/1991 | Tsuchiya | B65D 75/5844 206/497 |
| 5,086,610 A * | 2/1992 | Maki-Rahkola | B65B 11/04 53/211 |
| 5,125,210 A * | 6/1992 | Lang et al. | 53/399 |
| 5,131,213 A * | 7/1992 | Shanklin et al. | 53/477 |
| 5,203,137 A * | 4/1993 | Tsukada et al. | 53/409 |
| 5,226,269 A * | 7/1993 | Stoltenberg | 53/436 |
| 5,287,679 A * | 2/1994 | Dall'Omo | B29C 65/02 53/228 |
| 5,430,995 A * | 7/1995 | Cere | 53/556 |
| 5,462,807 A | 10/1995 | Halle et al. | |
| 5,505,037 A * | 4/1996 | Terminella et al. | 53/133.4 |
| 5,598,690 A * | 2/1997 | McClure et al. | 56/341 |
| 5,694,738 A * | 12/1997 | Shigeta | 53/234 |
| 5,775,058 A * | 7/1998 | Hirschek | 53/399 |
| 5,791,125 A * | 8/1998 | Kallner | 53/477 |
| 6,038,839 A * | 3/2000 | Linkiewicz | 53/551 |
| 6,138,442 A * | 10/2000 | Howard et al. | 53/477 |
| 6,155,030 A * | 12/2000 | Inoue | B29C 65/7847 53/374.2 |
| 6,162,314 A * | 12/2000 | Kassuelke et al. | 156/182 |
| 6,230,473 B1 * | 5/2001 | Rudolf | 53/449 |
| 6,341,470 B1 * | 1/2002 | Lacey | 53/176 |
| 6,408,596 B1 * | 6/2002 | Kammler | 53/373.7 |
| 6,565,969 B1 | 5/2003 | Lamon et al. | |
| 6,694,712 B2 * | 2/2004 | Suolahti | 53/588 |
| 6,787,209 B2 | 9/2004 | Mass et al. | |
| 6,862,867 B2 * | 3/2005 | Cady et al. | 53/434 |
| 6,960,157 B2 * | 11/2005 | Schackmuth et al. | 493/55 |
| 7,032,358 B2 * | 4/2006 | Dall'omo | B65B 25/146 53/216 |
| 7,182,827 B2 * | 2/2007 | Davis et al. | 156/187 |
| 7,285,335 B2 | 10/2007 | Aral et al. | |
| 7,308,780 B2 * | 12/2007 | Rimondi | 53/373.8 |
| 7,371,297 B2 * | 5/2008 | Caroli | B29C 66/49 156/64 |
| 7,476,428 B2 | 1/2009 | Burki et al. | |
| 7,811,661 B2 | 10/2010 | Goto et al. | |
| 8,071,196 B2 | 12/2011 | Goering | |
| 8,075,970 B2 | 12/2011 | Ikeda et al. | |
| 8,084,109 B2 | 12/2011 | Gao | |
| 8,512,851 B2 | 8/2013 | Mass | |
| 2002/0092279 A1 * | 7/2002 | Sperry et al. | 53/568 |
| 2003/0205034 A1 * | 11/2003 | Sus et al. | 53/502 |
| 2005/0126129 A1 * | 6/2005 | Nesci | 53/510 |
| 2008/0072545 A1 * | 3/2008 | Kovacs | 53/450 |
| 2008/0209854 A1 * | 9/2008 | Gustafsson | 53/79 |
| 2008/0250753 A1 * | 10/2008 | Sperry et al. | 53/80 |
| 2009/0044496 A1 * | 2/2009 | Botelho et al. | 53/477 |
| 2009/0107348 A1 * | 4/2009 | Noonan et al. | 100/8 |
| 2009/0223178 A1 * | 9/2009 | Ballestrazzi | B29C 65/18 53/552 |
| 2011/0214392 A1 * | 9/2011 | Niven | 53/375.9 |

* cited by examiner

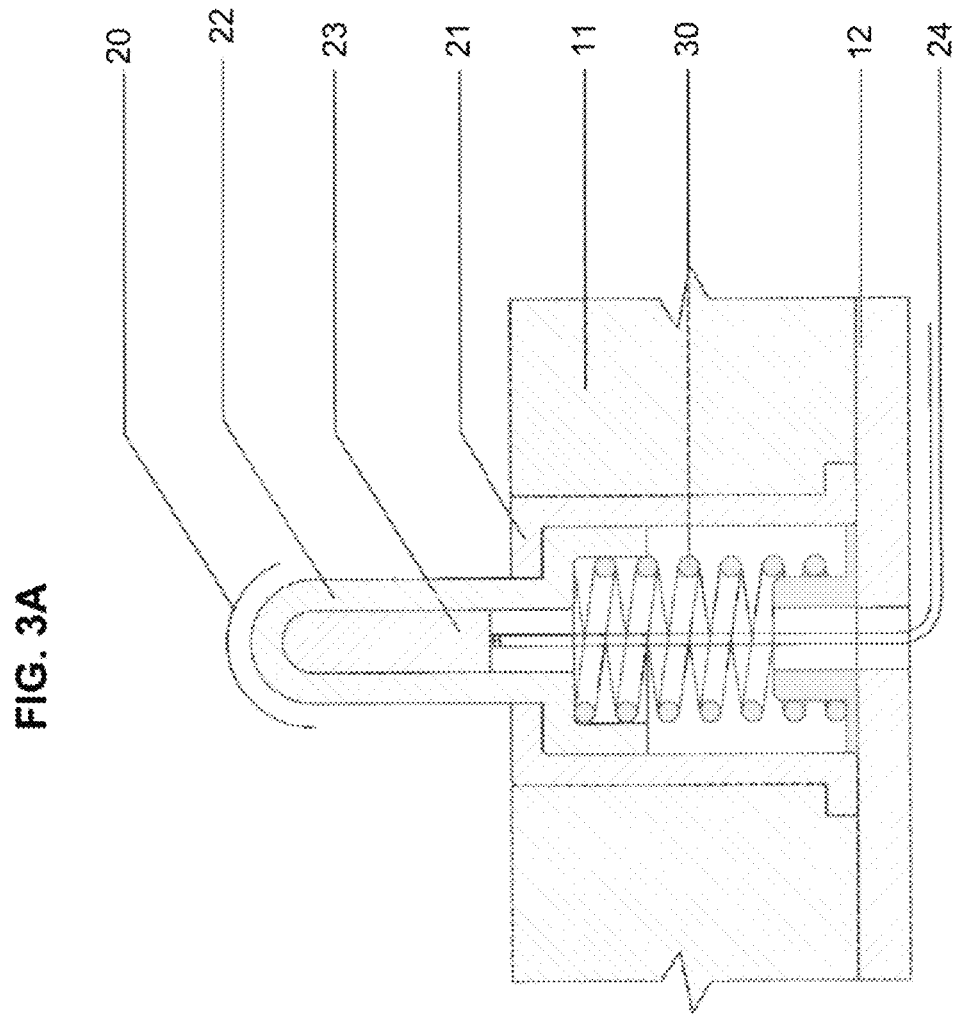

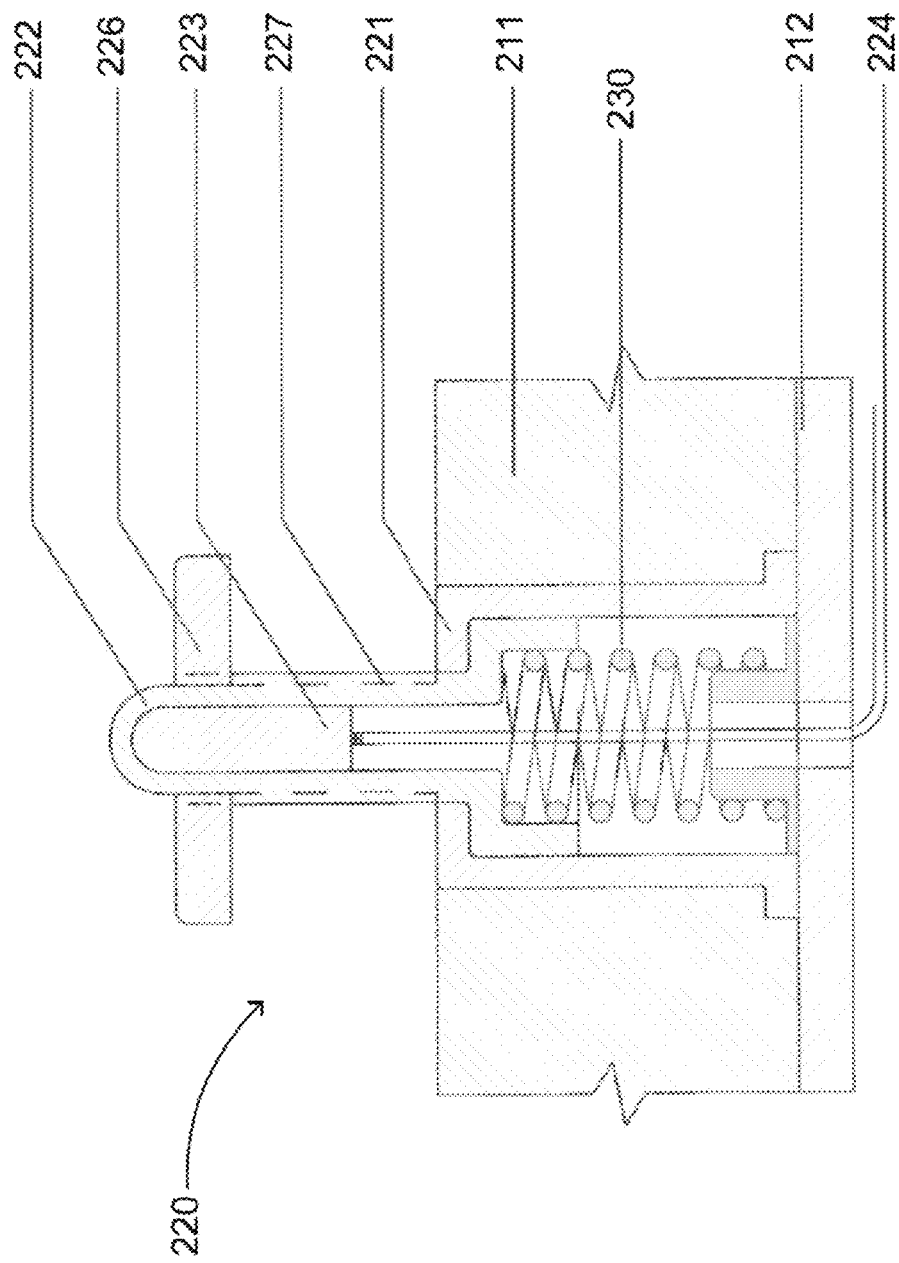

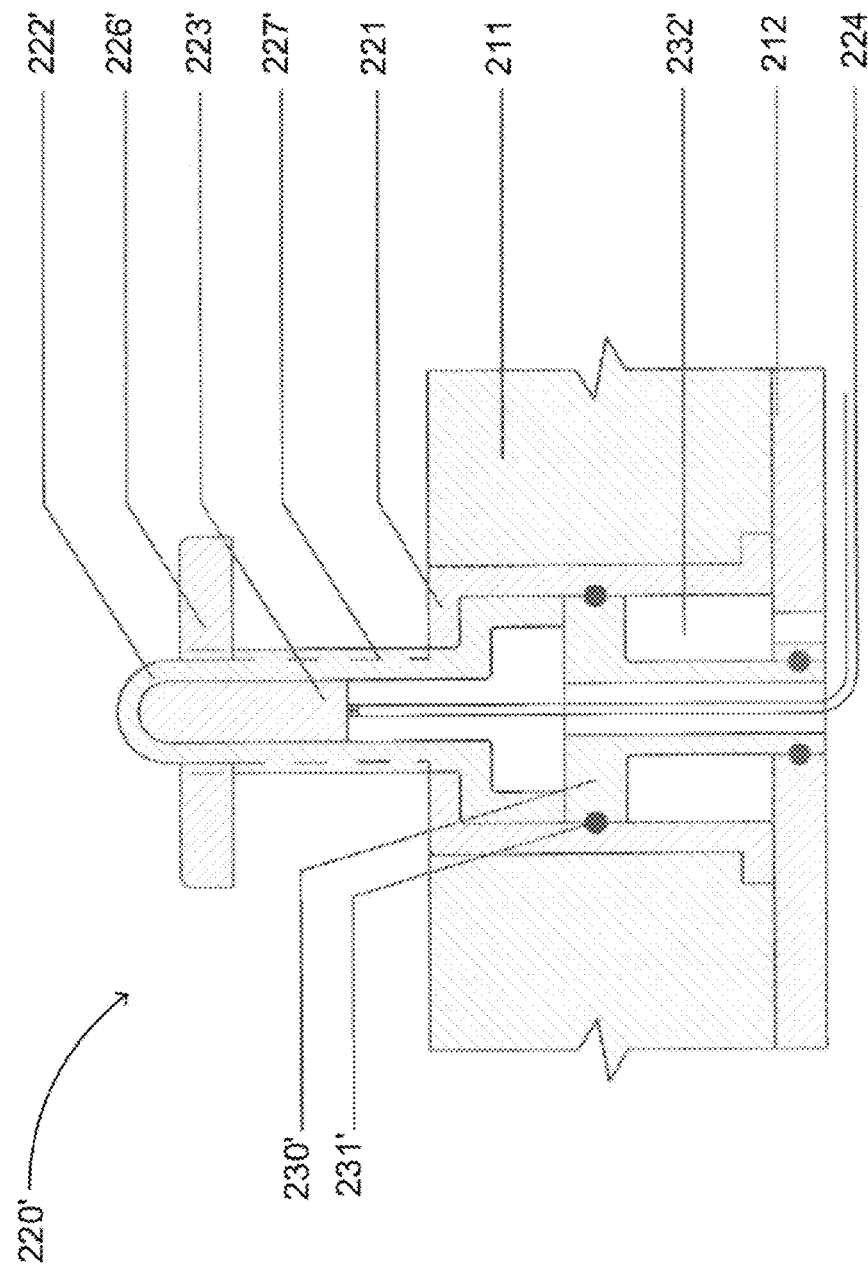

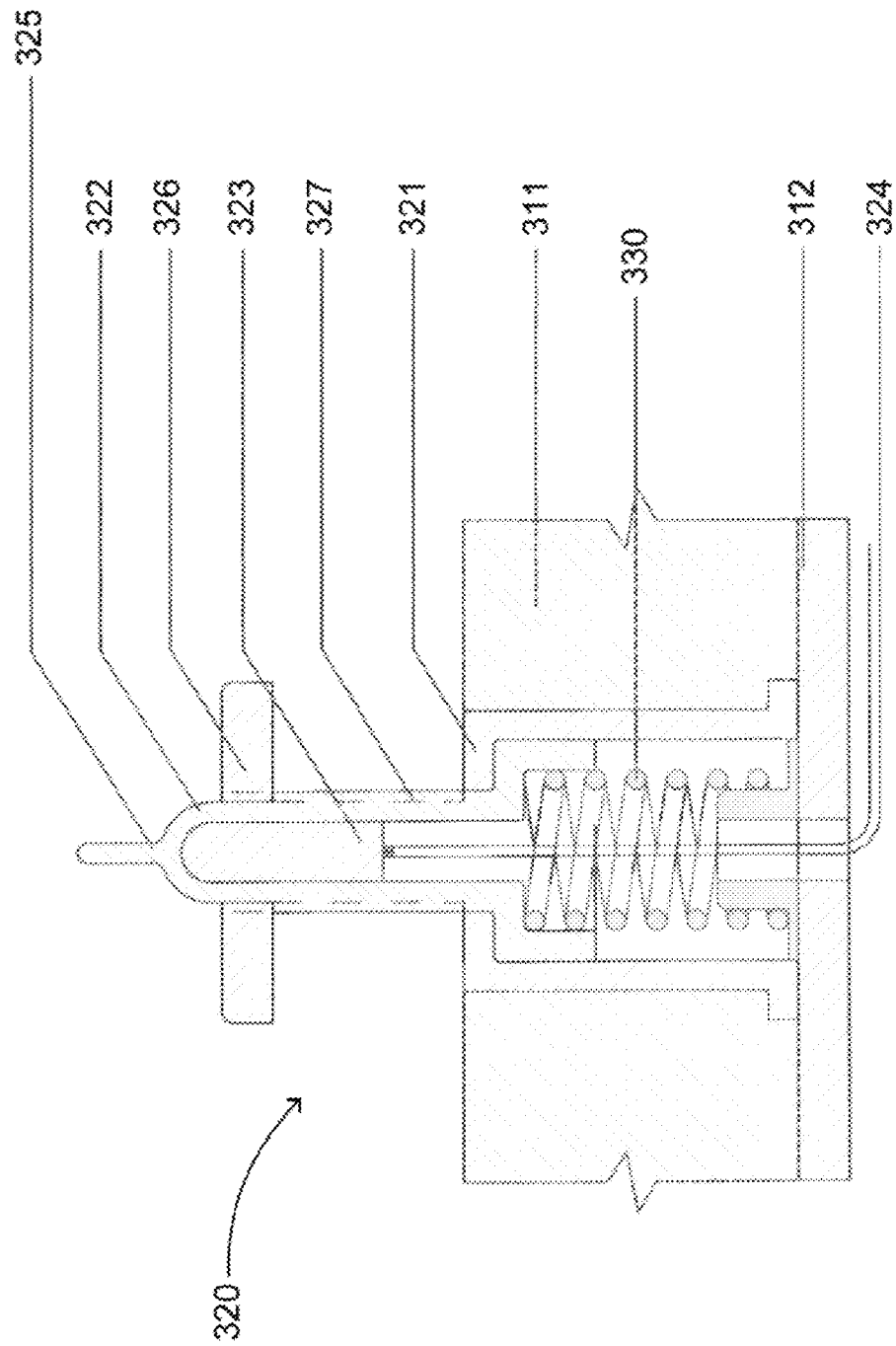

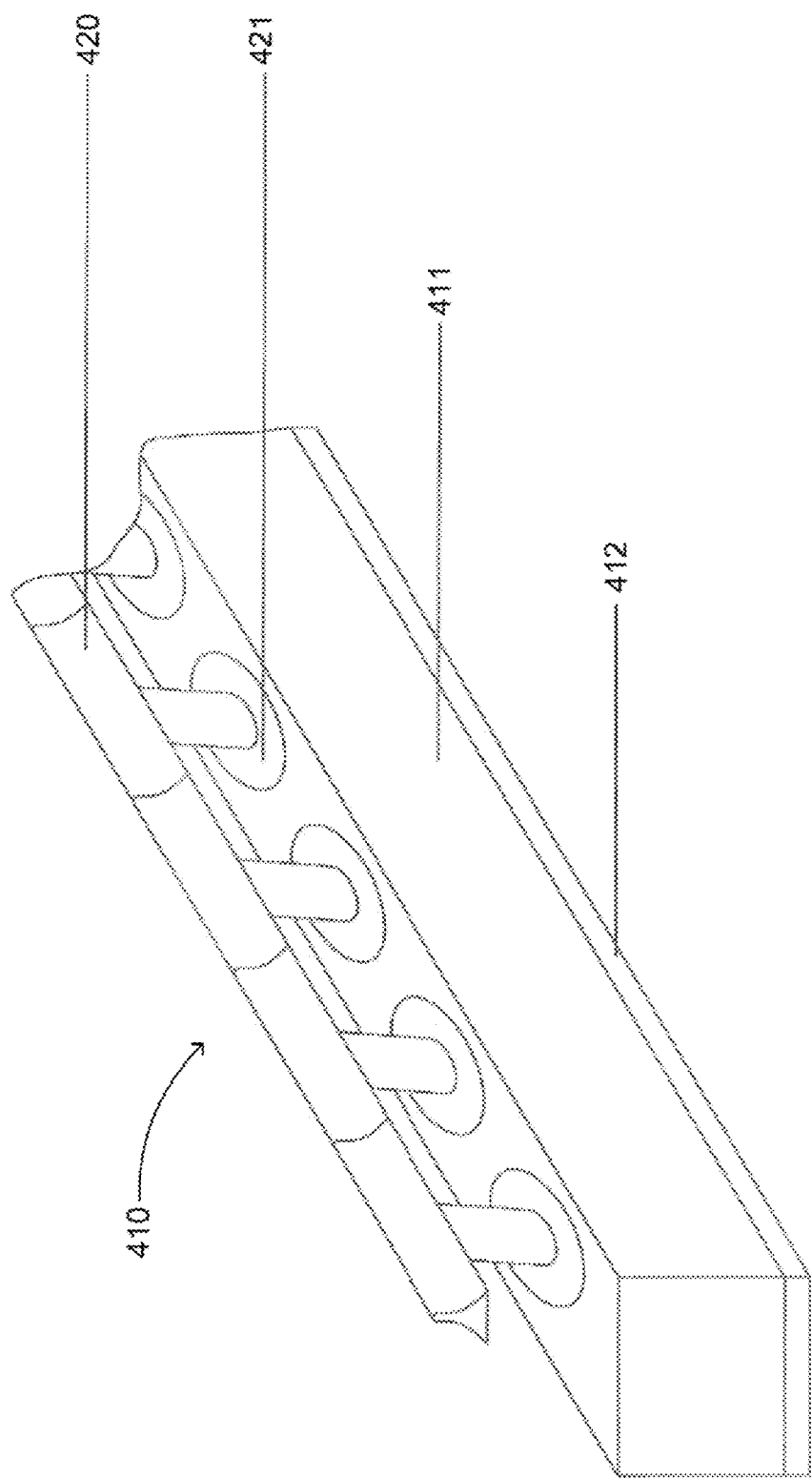

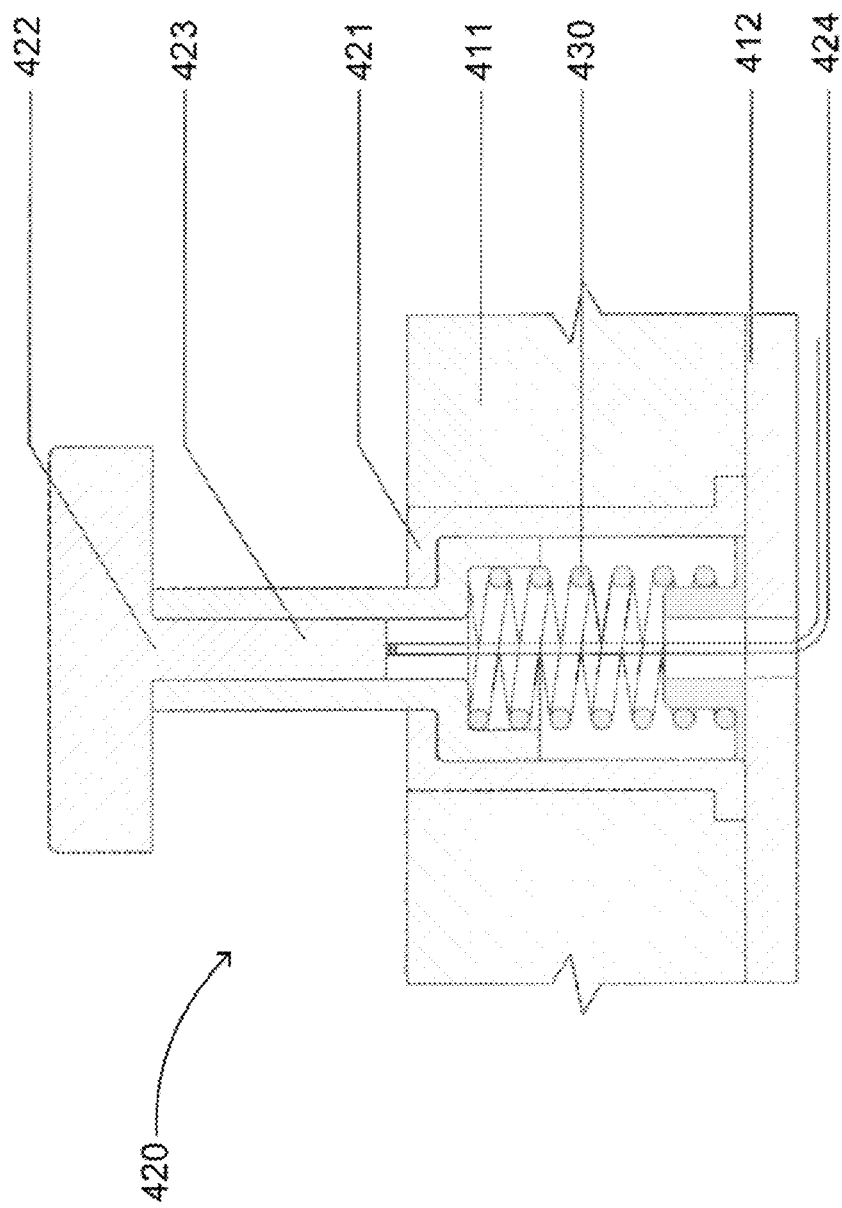

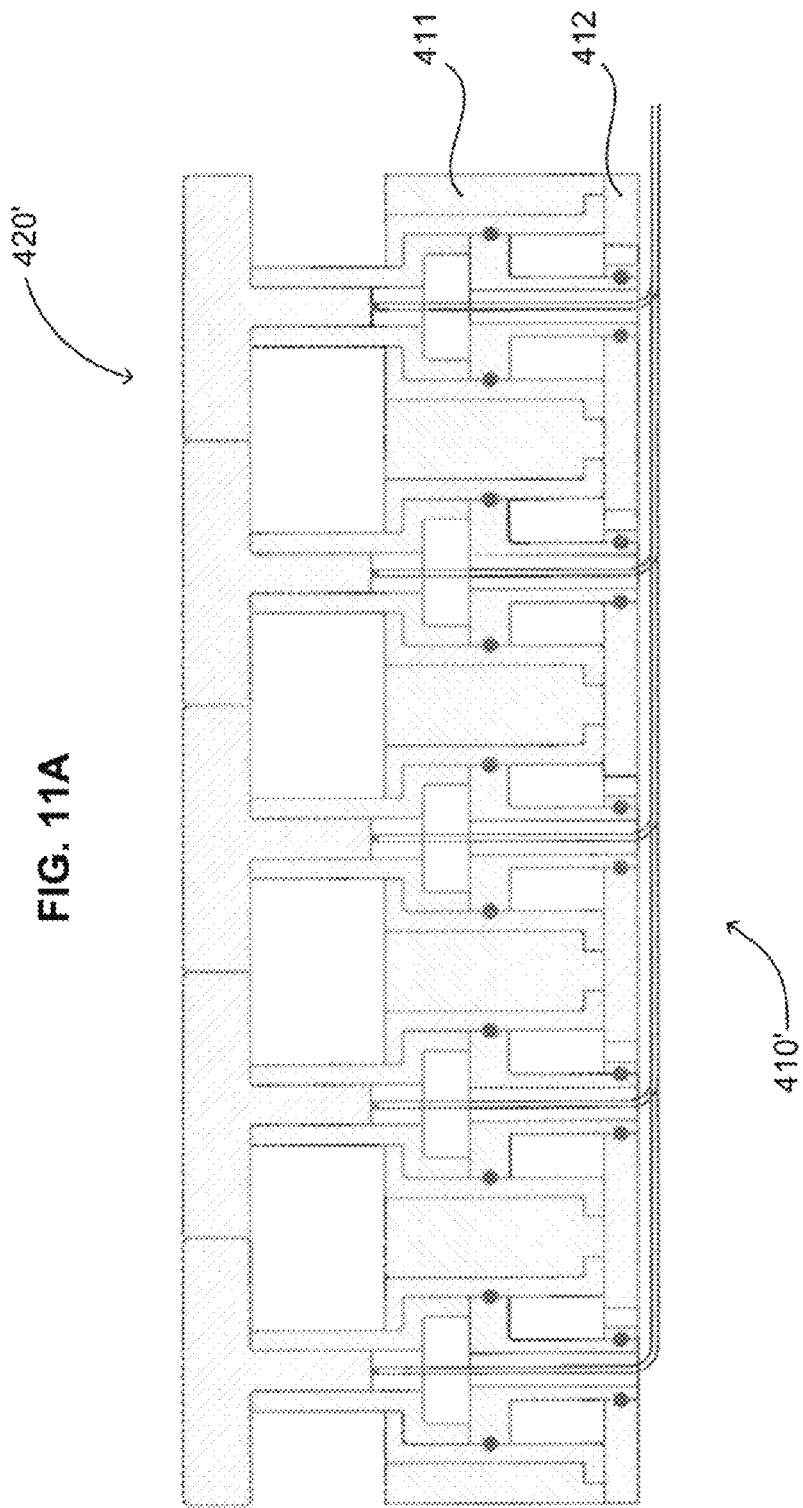

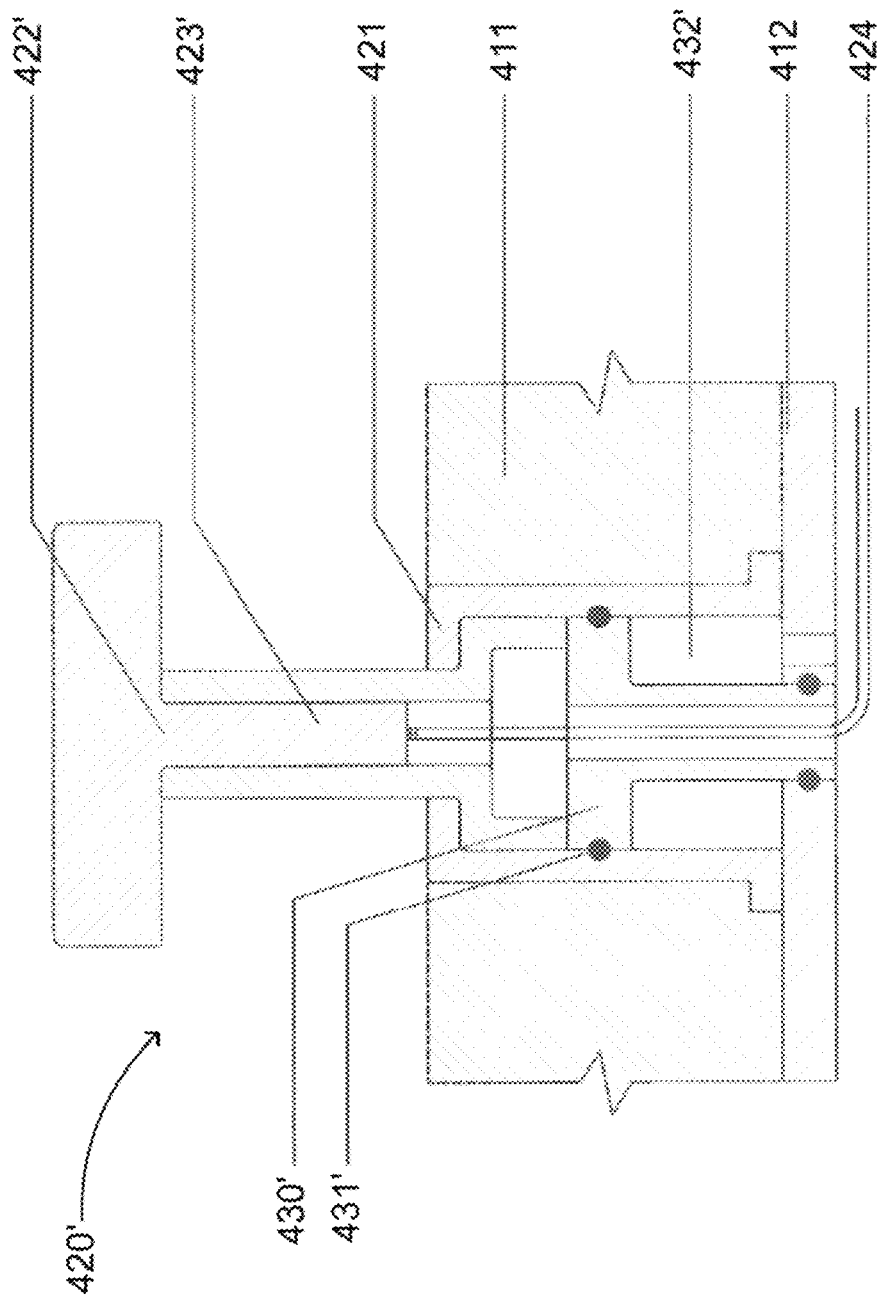

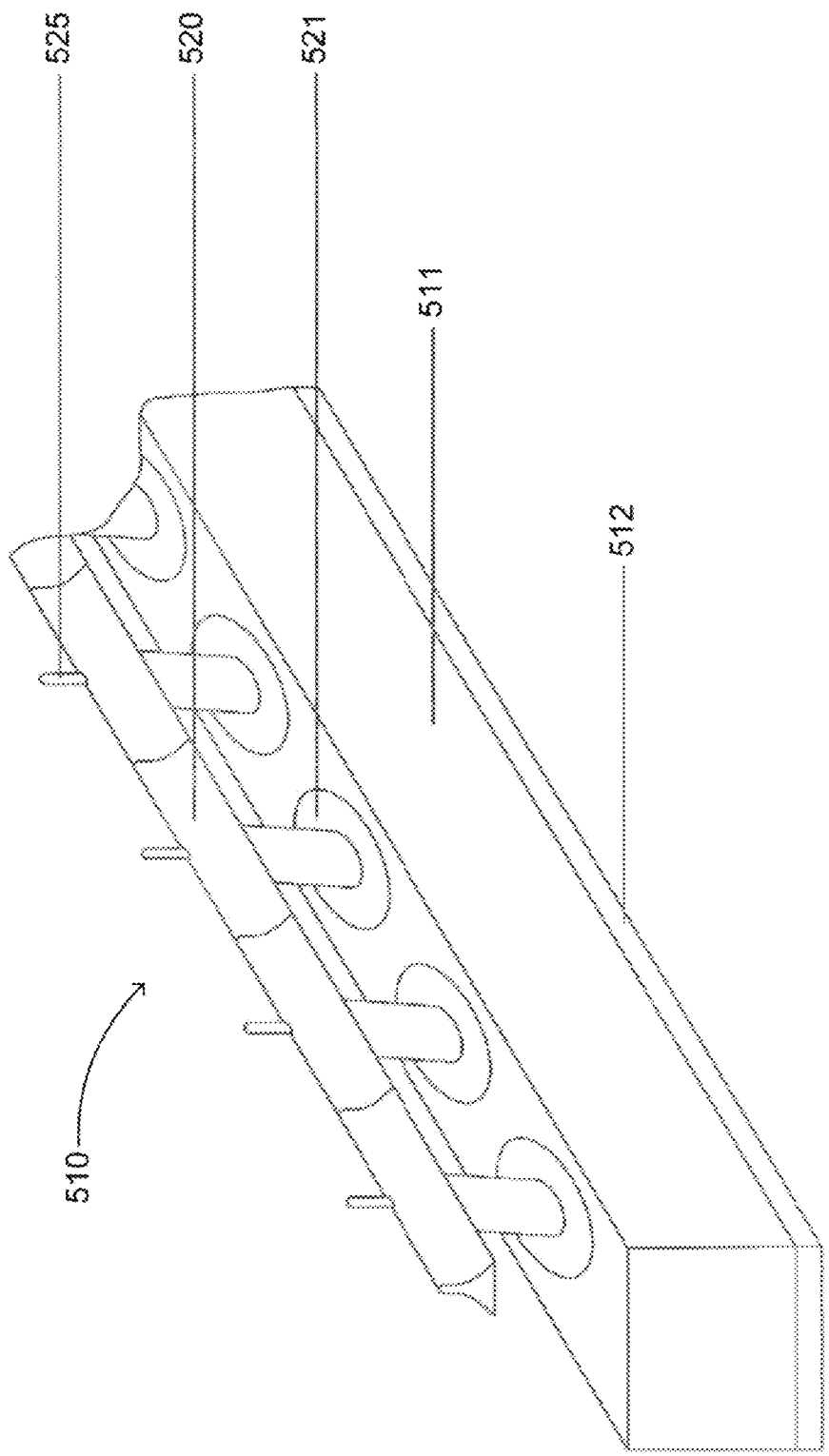

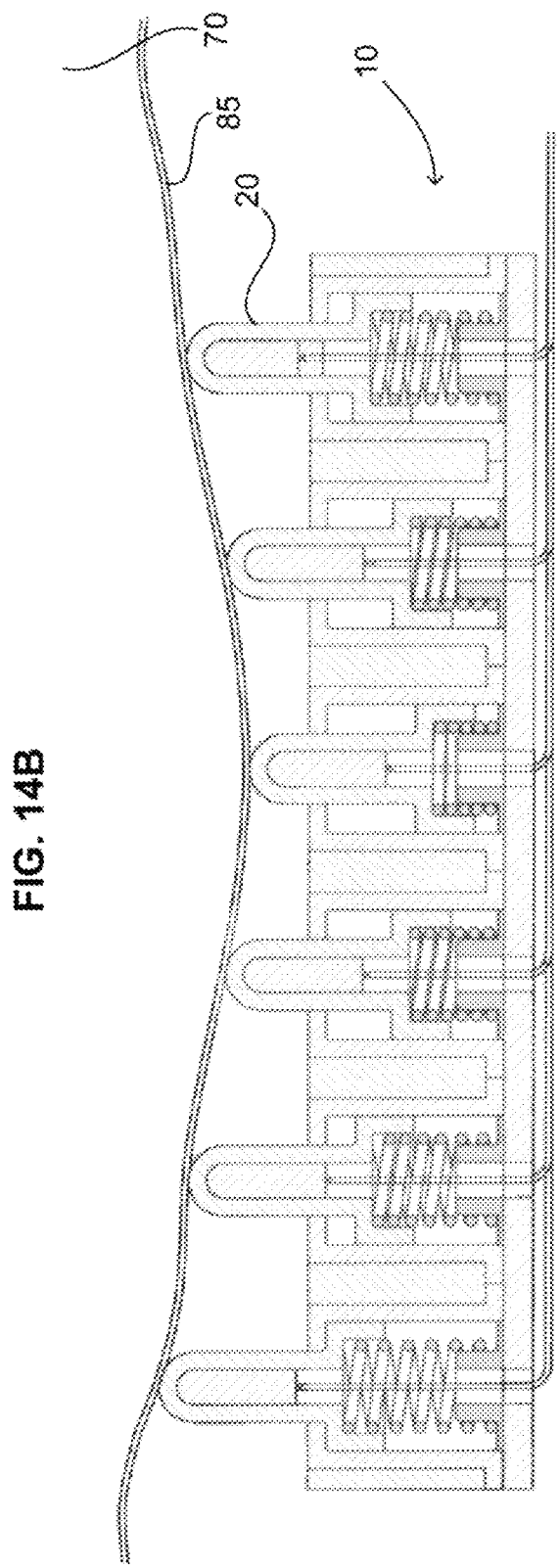

METHOD AND APPARATUS FOR SECURING BALED ITEMS

BACKGROUND OF THE INVENTION

Baling agricultural produce is a well-known and frequently used practice throughout the world. Various methods, techniques, products, materials and equipment have been used to harvest, bale and wrap agricultural produce. In recent years, knitted nets and films have been replacing the wire/sisal twine and baling twine which have been traditionally used. These nets and films are commonly constructed of polypropylene/polyethylene.

Some recent wrapping materials have included a tacky film for wrapping baled items, such as agricultural produce. Such products have also been applied in a supplemental use after wrapping the bale with net or twine, with the aim of producing silage. Alternatively, such films could also be used as a replacement to the net or the twine, or any other alternative wrapping material. In any event, typically, these various types of wrapping methods and products require more than one layer of wrapping material.

Regardless of the wrapping material used, the wrapping material must maintain the bale within the wrapping until the user opens the bale for use in its designated purpose, such as: distribution of the agricultural product in the targeted area (manger or stall); feeding and/or processing; or the like.

Both square and round bales are usually wrapped by means of film in standard widths of 50 or 75 cm in the shape of a bandage while rotating the bales on two axes. Although the film is tacky, due to dusty conditions, moisture or wind, the tackiness is often not sufficient to keep the tail fastened, such that the tail opens prematurely compromising the wrap and, potentially, the baled item within the wrap by, for example, exposing the baled item to the environmental elements.

Since the wrapping material is wound on a storage roll, prior to use, the maximum level of tackiness which can be bestowed on the film is limited to a tackiness level which allows release of the wrapping material from the roll of material for use in the wrapping process.

An additional disadvantage and limitation which exists in the prior art tacky films is that the tackiness of the film is uniform throughout the area of application, and may be positioned on both sides, or on one side only.

Consequently, due to the low bonding strength of such materials with such a given level of tackiness, which is imparted during the manufacturing process of the wrapping material, many such materials are manufactured to include tacky areas along the entire length of one side or both sides of the film. In each of these cases, the entire area of the film is tacky and the level of tackiness is limited to the strength required in order to release the wrapping material from the roll of material. There are two fundamental disadvantages with such tacky wrapping materials: first, the level of tackiness must be limited, and second, the tackiness is essentially uniform over the entire wrapping area.

Over the years, in an attempt to solve the problem of fastening the bales wrapped with such films, a number of solutions were proposed, such as is described in U.S. Pat. No. 6,787,209, PCT Application No. PCT/IB2005/003589, and U.S. application Ser. No. 12/405,526, all of which are incorporated herein by reference as if fully set forth herein. Such proposed solutions entailed the use of adhesive at the end of the wrap, or by use of fasteners (e.g., Velcro®).

Also, it has been proposed to use adhesive at the end or tail of a wrapping material, as described in U.S. Pat. No. 6,787,209. However, disadvantages of this technique are reported, e.g., with increased stress created at the tail of the wrapping material when wrapping compressed and baled agricultural items, requiring particularly strong adhesive. According to the patent, this strong adhesive had to be spread over a wide area of the tail creating disadvantages.

Moreover, the method, such as is described in PCT Application No. PCT/IB2005/003589 and U.S. application Ser. No. 12/405,526, using Velcro® fasteners and other like male-female connections suffers from a problem of not being reliable and not being financially viable. For example, when the baled item deviates from the original determined specifications, due to the nature of the agricultural product, then only partial attachment is obtained which results in improper fixation of the tail, exposure to penetration of water or humidity, and the like. Further, if extreme deviation occurs, the male and female parts may not engage at all.

Yet another attempt to solve the foregoing disadvantages is disclosed in U.S. application Ser. No. 12/113,720, incorporated by reference herein as if fully set forth herein, using wrapping material with opposing adhesive means.

Many areas exist where wrapped bales remain out under the open sky for a certain period of time until use, as opposed to storing the bale in dry places, and protected locations such as warehouses and/or under a roof, so as to prevent penetration of rain water to the bale. Occasionally, this period of exposure to the elements can extend over two years or more. During this period the wrapped bale is exposed to the forces of nature and under these circumstances the need for a bale wrapping having strong fastening properties at the tail of the wrapping material becomes acute.

SUMMARY OF THE INVENTION

Generally, the present invention concerns the development of a method and an apparatus for securing baled and wrapped items, and in particular, for securing the wrapping material surrounding a round bale of baled items, such as agricultural produce. Typically, the wrapping material for use with the present invention is polymer-based, and particularly a polymeric wrapping material that can melt, weld, bond or fuse to adjacent layers of wrapping material when energy, such as heat, is applied. Materials other than polymer-based may also be used so long as they are susceptible, as above, to energy, such as heat. The present invention also focuses on the method and apparatus designated for securing the wrapping material, for example, the tail of the wrapped material, around the baled item without the use of other securing agents such as adhesives, fasteners and the like. Such agricultural produce which may be baled and wrapped using the present invention includes, for example, hay, straw, silage, or the like.

In one embodiment of the present invention, an apparatus includes a main plate and at least one projection. The at least one projection is adapted to secure a wrapping material around a baled item. For example, the projection or projections of the apparatus may be adapted to apply energy, such as heat, to melt, fuse or weld a tail of the wrapping material to an underlying layer or layers of wrapping material which is wrapped around a baled item, such as the above agricultural produce.

The main plate may have a predetermined length according to the length of the baled item to be wrapped. The projection may have a shape suitable for contacting the tail of the wrapping material. Alternatively, the projection may include a sharp tip adapted to puncture through the tail of the wrapping material and puncture and/or contact at least an underlying layer of wrapping material. The sharp tip may also be suitable to puncture through at least the underlying layer, or all layers of wrapping material and contact the baled item, whereby the projection is adapted to secure the tail and all underlying layers to one another.

In another embodiment, the present invention includes an apparatus for securing a wrapping material around an item, the apparatus including a main plate and at least one projection, the projection including a heating element and a height adjustment mechanism, wherein the height adjustment mechanism controls a force applied to the wrapping material by the projection and provides a force for moving the projection. The item may be a baled agricultural item. The height adjustment mechanism may be a spring, a pressurized air cylinder, or the like. The projection may also include a sharp tip, a stopper disc, or both. The height adjustment mechanism may be capable of adjusting a force applied to the wrapping material by the sharp tip, such that the height adjustment mechanism may be capable of adjusting the depth of penetration of the projection. The apparatus may also include a plurality of projections positioned along a length of the main plate.

In a further embodiment, the present invention includes a method of securing a wrapping material around a baled item, including baling an item using a baling machine; wrapping the baled item with a wrapping material having a leading end and a following end, the following end having a tail portion, wherein the wrapping material wraps around the baled item with at least one complete revolution forming at least one underlying layer such that the tail portion of the wrapping material overlaps the underlying layer; contacting the tail portion with an apparatus, the apparatus comprising a main plate and at least one projection, the projection including a heating element; welding the tail portion to the underlying layer by transferring heat to the tail portion from the heating element of the projection to form a welded wrapped baled item; and removing the welded wrapped baled item from the baling machine.

Continuing with this embodiment, the baled item and wrapping material may move continuously through the baling machine, over the apparatus and out of the baling machine without stopping. Alternatively, the baled item and wrapping material may stop atop the apparatus such that the tail portion is positioned adjacent the apparatus. Further, the apparatus may include a plurality of projections and each projection may include a height adjustment mechanism, the height adjustment mechanisms can control a force applied to the wrapping material by the projections and may provide a force for moving the projections, wherein the baled item and wrapping material may include an uneven surface, such that the height adjustment mechanism of each projection positions each projection into contact with the uneven surface of the wrapping material and controls the force applied by each projection to the wrapping material.

The projection or projections may also include a sharp tip such that the projection or projections can puncture through the tail portion and can directly engage the underlying layer. The wrapping material may wrap around the baled item two or more complete revolutions forming two or more underlying layers, the projection can puncture through the tail portion and each of the underlying layers, thereby welding each of the underlying layers and tail portion to one another. The projection may also include a height adjustment mechanism, the height adjustment mechanism being capable of adjusting the depth of penetration of the projection such that the height adjustment mechanism limits a depth to which the projection punctures through the wrapping material, the baled item or both. The height adjustment mechanism may also control the projection to puncture through the tail portion and underlying layers of the wrapping material but prevent contact between the projection and the baled item.

BRIEF DESCRIPTION OF THE DRAWINGS

FIGS. 3A and 3B illustrate cross-sectional views of two alternative embodiments of the projection of the apparatus of FIG. 2.

FIGS. 7A and 7B illustrate cross-sectional views of two alternative embodiments of the projection of the apparatus of FIG. 6.

FIG. 9 illustrates a cross-sectional view of the projection of the apparatus of FIG. 8.

FIG. 10A illustrates still a further embodiment of the apparatus of the present invention.

FIG. 10B illustrates a cross-sectional view of the projection of the apparatus of FIG. 10A.

FIG. 11A illustrates a cross-sectional view of another embodiment of the apparatus of the present invention.

FIG. 11B illustrates a cross-sectional view of the projection of the apparatus of FIG. 11A.

FIG. 12 illustrates an additional embodiment of the apparatus of the present invention.

FIG. 14B illustrates the apparatus of FIG. 14A engaging wrapping material around a baled item, wherein the wrapping material and baled item has an uneven surface.

DETAILED DESCRIPTION

Figure 1:
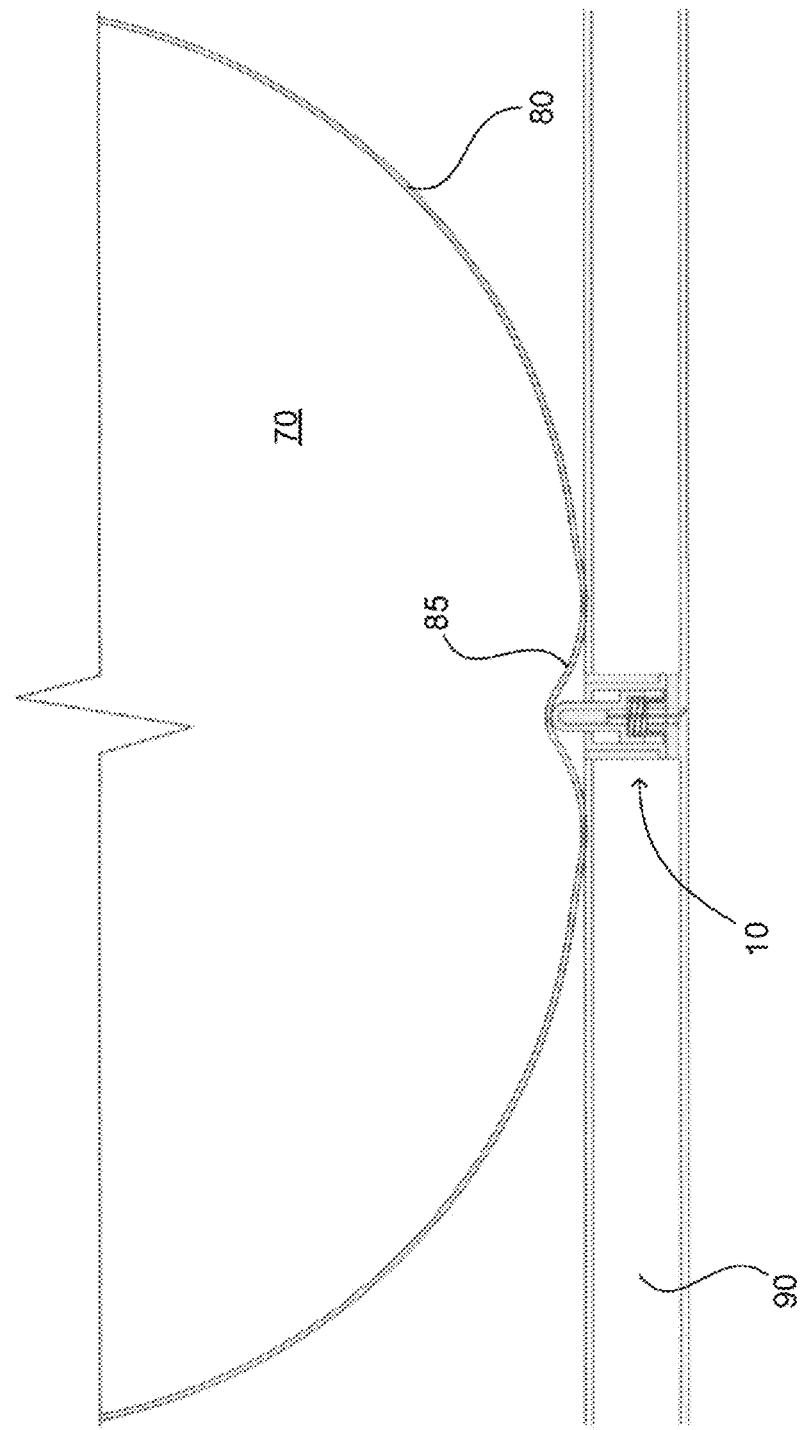
FIG. 1 illustrates one embodiment of the apparatus positioned relative to a wrapping material around a baled item.

FIG. 1 illustrates a general configuration of the present invention in which an apparatus 10 is positioned within a wrapping and baling machine 90, such machine 90 may be any suitable machine known in the prior art, such as for example the 9 Series Round Balers (Deere & Company, Moline, Ill.). The apparatus 10 generally has a predetermined length according to the width of the baled item 70 to be wrapped with a wrapping material 80. The wrapping material includes a leading end and a following end, the following end having a tail portion 85. The length of the apparatus should be at least equal to the width of the baled item 70 to ensure that the wrapping material (which should also be generally equal to the width of the baled item) is secured along its entire width. While the apparatus may be longer than the width of the baled item, it is preferable that the apparatus not be shorter than the width of the baled item, though of course, multiple apparatus may be positioned end-to-end to attain the full width of the baled item.

The baled item 70 may be any desired agricultural product such as, for example, hay, straw, silage, or the like. As discussed with regard to the present invention, the baled item 70 is shaped as a "round bale," such that the baled item is generally cylindrical in shape. Typically, upon collection and baling of the agricultural product, the baled item 70 may weigh over 1,000 lbs. and commonly may weigh over 2,000 lbs. Also, such baled items 70 have a width of several feet, commonly about 4 ft., and may be several feet tall, commonly 4 ft. to about 6 ft.

Such dimensions of the baled item 70 create unique problems in wrapping the baled item to ensure the baled item, once wrapped and released from the baling machine, maintains its integrity. Thus, the wrapping material 80 must have sufficient strength to withstand the various forces associated with maintaining the baled item as a round bale. For example, the wrapping material must have sufficient structural strength to hold the agricultural product in the compressed shape of the round bale. Further, the end of the wrapping material, the tail portion 85, must be secured such that the wrapping material does not unwind from the baled item. Due to the wrapping material being secured only at this tail portion, the tail portion must have a high shear strength to counteract the desire of the baled item to expand, and thus, the wrapping material to unwind. In other words, the tail portion, once welded, must have the strength to resist sliding of the tail portion along the portion of the wrapping material, such as an underlying layer, to which is was welded. As such, the weld between the tail portion and the underlying layer must have a high adhesive strength to ensure the tail portion is firmly secured to the portion of the underlying layer to which it was welded.

The apparatus includes at least one projection positioned along the length of a main plate, as discussed below, wherein the projection or projections is capable of transferring energy to the tail portion 85 of the wrapping material as well as optionally to the underling layer or layers of wrapping material 80 to secure the wrapped baled item 70. For example, the projection or projections may be heated to a predetermined target temperature required to melt, weld or fuse the tail portion 85 to the underlying layer or layers of wrapping material 70. The terms melt, weld, bond, fuse and the like may be used interchangeably herein to mean that a portion of the wrapping material, through the presence of energy such as heat, is softened, has increased tackiness, or is otherwise more susceptible to bonding to adjacent materials which come into contact with the portion. One example, used throughout when discussing the various embodiments of the present invention, is when the tail portion of the wrapping material is in the presence of the projections of the apparatus, and thus heat, the tail portion is softened or has increased tackiness such that it may bond to the underlying layer of wrapping material, as illustrated in FIG. 1. The bonding, fusing, welding or melting of the present invention is a bond between portions of wrapping material at a molecular level, which results in a strong adhesive strength and shear strength between layers of wrapping material which has minimal susceptibility to environmental conditions or other variables which affect other known wrapping methods.

The baled item 70 and associated wrapping material 80, to be welded into position around the baled item, may contact the apparatus 10, as shown in FIG. 1, during any step of the process of the baling and wrapping of the baled item, though of course the wrapped baled item typically contacts the apparatus once the wrapping material is wound around the baled item and as such is ready to be secured thereon. Thus, the wrapped baled item may be statically positioned on the apparatus 10, such that it is stationary on the apparatus for a period of time. Alternatively, the wrapped baled item may merely pass over the apparatus 10 while the wrapped baled item is rolling out of the wrapping and baling machine 90 and to the ground, storage location, or the like. In this alternative arrangement, the welding step occurs as the wrapped baled item passes on top of and over the apparatus 10. Generally, welding is achieved by controlling the temperature and the time the welded product rests or passes on top of the welding device. In other words, successful welding of the wrapping material depends on temperature and the period of time where the wrapping material, such as the tail portion 85, comes into a contact with the projections of the apparatus.

Figure 2:
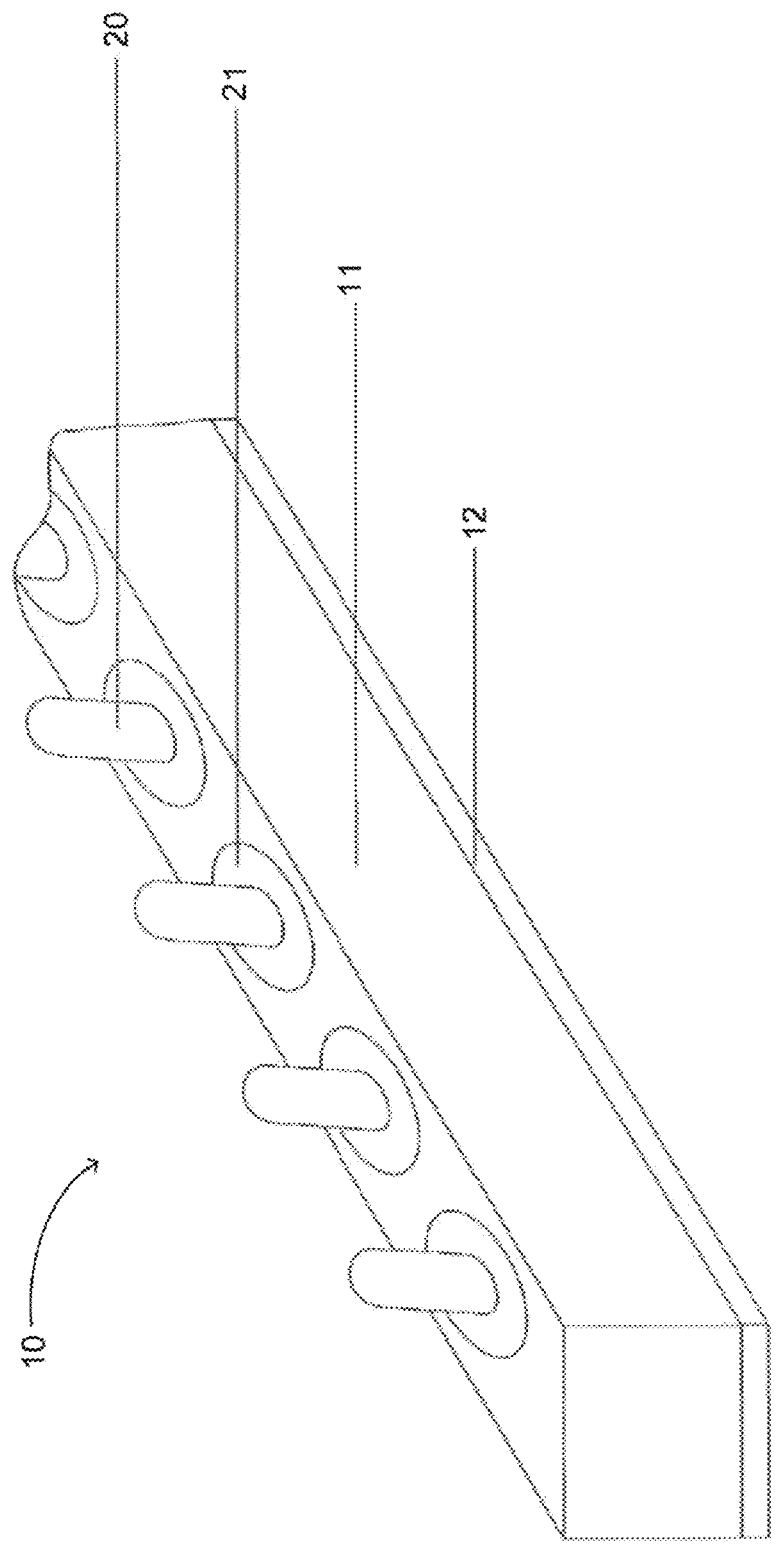
FIG. 2 illustrates an embodiment of the apparatus of the present invention.

FIG. 2 illustrates one embodiment of the apparatus 10 of the present invention. The apparatus includes a main plate 11 and at least one projection 20 positioned along the length of the main plate. The main plate may be secured to a base plate 12 which, in turn, is secured to the baling and wrapping machine 90, or other location. In between each projection 20 and the main plate may be positioned an insulating sleeve 21 which is intended to minimize heat transfer away from the projection and through the main plate. The insulating sleeve may also increase energy efficiency in the apparatus such that the projections maintain a desired temperature with greater consistency and with less energy input. The main plate, as illustrated, may have a generally rectangular, flat shape; however, the main plate is not limited to this dimension and could also be of a different dimensional shape, and include a face that is concave, convex, stepped, or the like.

The number of projections, as well as their shape and placement on the main plate, may be predetermined according to the dimension of the wrapped baled item and the desired securing level. Alternatively, it is envisioned that the main plate, placement of projections, and the like can be a "one-size-fits-all" shape such that, for example, the baled item may be shorter than the main plate such that not all of the projections would be used. Of course, it is preferable that the baled item be generally the same length, or shorter, than the main plate to ensure that the entire length of the baled item is properly wrapped and secured. The main plate can be comprised of any combination of projections, such as those disclosed herein, such that the projection may be of any shape as necessary or suitable for a particular application. For example, the shape may be generally cylindrical with a rounded tip (for example, FIGS. 3A and 3B), generally cylindrical with a sharp tip (for example, FIG. 5), generally cylindrical with a flattened tip (for example, FIGS. 10B, 11B), generally triangular, generally rectangular, generally ovular, or any other suitable shape. The projections may also include a stopper disc (for example, FIGS. 7A, 7B). In addition, the main plate can include several distinct areas of projections to create an intended welding or melting pattern along the length or a portion of the length of the wrapping material. For example, the projections may be, along the length of the main plate, clustered into several groups, or alternatively, the projections may be evenly spaced along the length of the main plate (as illustrated throughout the figures herein), or have any other desired configuration.

FIG. 3A illustrates an embodiment of the projection 20 positioned along the main plate 11. The projection 20 includes an outer projection surface 22, forming a generally cylindrical body with a rounded tip, an inner heating element 23 which can be regulated by a thermostat (not shown, optional), and wiring 24 connecting the heating element with an energy source and the thermostat (if present). The wiring may allow for control by a user of whether the heating element of a particular projection is using energy, the amount of energy being used by the specific heating element, control and maintenance of the temperature of the heating element, and the like.

Figure 14A:
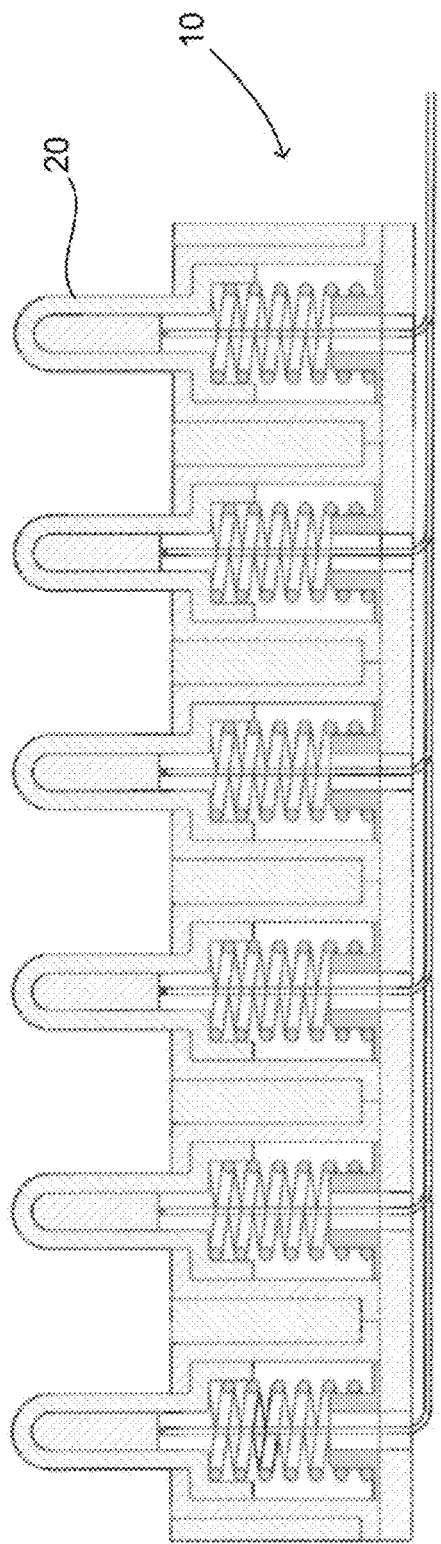
FIG. 14A illustrates a cross-sectional view of the apparatus and projections of FIGS. 2 and 3A.

Additionally, the projections may include a height adjustment mechanism, such as spring 30, such that the height of the projection can be adjustable. The spring 30 may allow the projection to adjust between a height, as in FIGS. 2 and 3A, where the projection is extending from the main plate 11 to a position, shown as to certain of the projections in FIG. 14B, where most if not all of the projection is positioned within the main plate. This height may be determined according to the wrapped product shape, the type of wrapping material, the type of baled item, or the like. While the applications of the projection with the spring will be discussed in greater detail below, the spring may allow for such uses as allowing for selective contact of the projection to the wrapping material and the baled item, allowing for adjustment of the amount of force the projection applies to the wrapping material and/or baled item, allowing for the uniform application of heat to an uneven surface of the wrapping material and baled item, and the like.

Figure 3B:
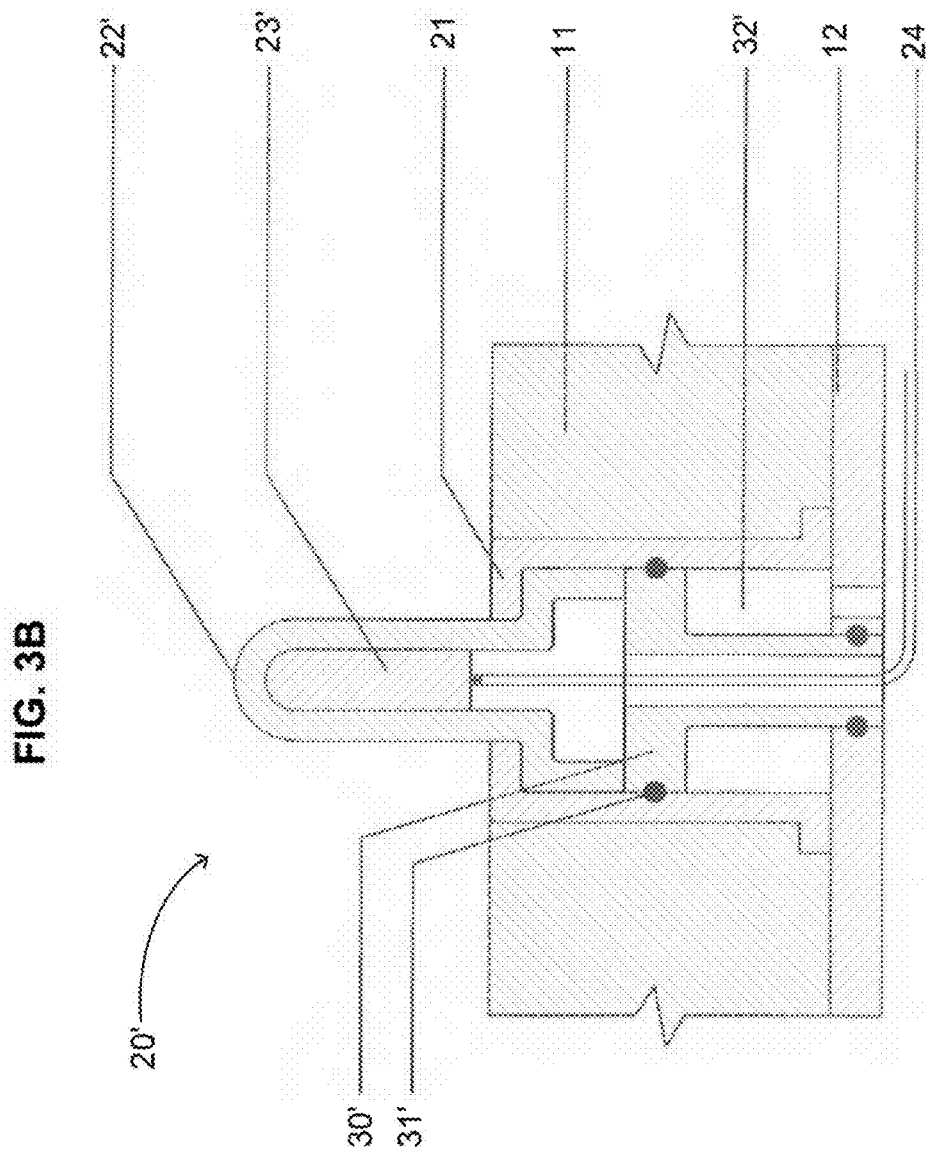

Other mechanisms, other than the spring 30, may be used such as, for example, a pressurized air cylinder as illustrated in FIG. 3B, a pressurized oil cylinder, an electronic servo, a command from a computer program, or the like. The projection 20' of FIG. 3B includes, rather than a spring, a pressurized air cylinder including a piston 30', a seal element 31' (such as an o-ring) and a volume of pressurized air 32'. In this alternative embodiment of the projection, the outer projection surface 22' and heating element 23' may have an adjustable height, relative to the main plate 11, by movement of the piston 30'. For example, the user may regulate the pressure of the pressurized air 32' to determine what height the projection will be positioned and/or the amount of force which would be required to depress the projection 20' from a tallest height, as shown in FIG. 3B, to a lower height. In one specific exemplary application, in the configuration where the wrapped baled item comes to rest atop the apparatus 10, the default position of the projections 20' may be in the lowered position, such that they are mostly if not totally within the main plate 11. Once the baled item is atop the apparatus, the air pressure may be increased such that the projections rise and extend from the main plate and contact the wrapping material of the wrapped baled item. Alternatively, the pressurized air 32' may remain constant such that the projections 20' along the main plate 11 all have a predetermined level of air pressure. This alternative may be used, for example, where the wrapped baled item merely rolls over the apparatus 10, such that the piston 30' of each projection 20' allows each projection to adjust its height based on the contour of the surface of the wrapping material. Thus, as discussed in detail below, the use of the pressurized air cylinder, as with the spring 30 above, allows for a uniform application of heat along the width of the wrapping material, such as the tail portion 85, even where the surface of the wrapping material is uneven, as in FIG. 15.

Figure 4:
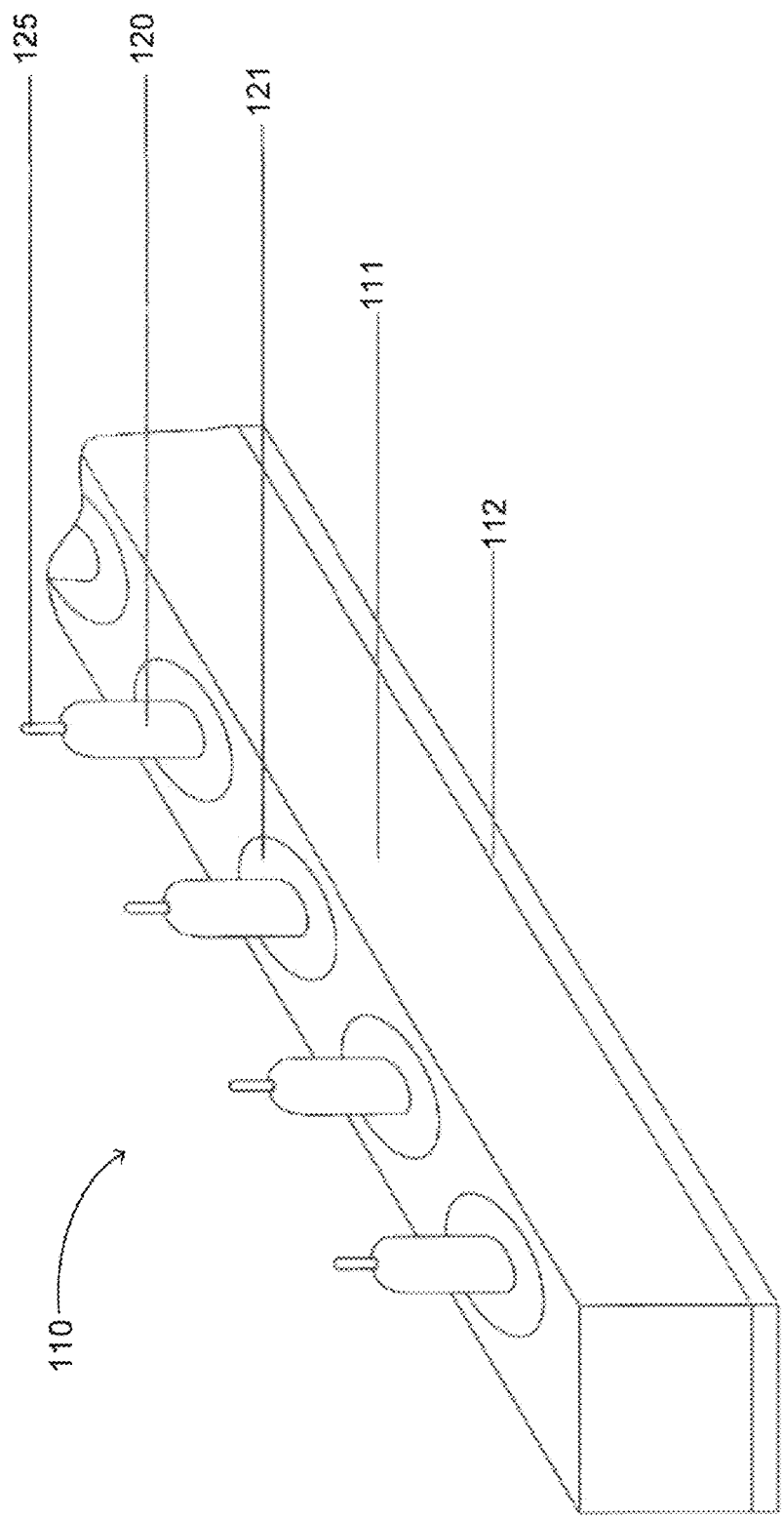
FIG. 4 illustrates another embodiment of the apparatus of the present invention.
Figure 5:
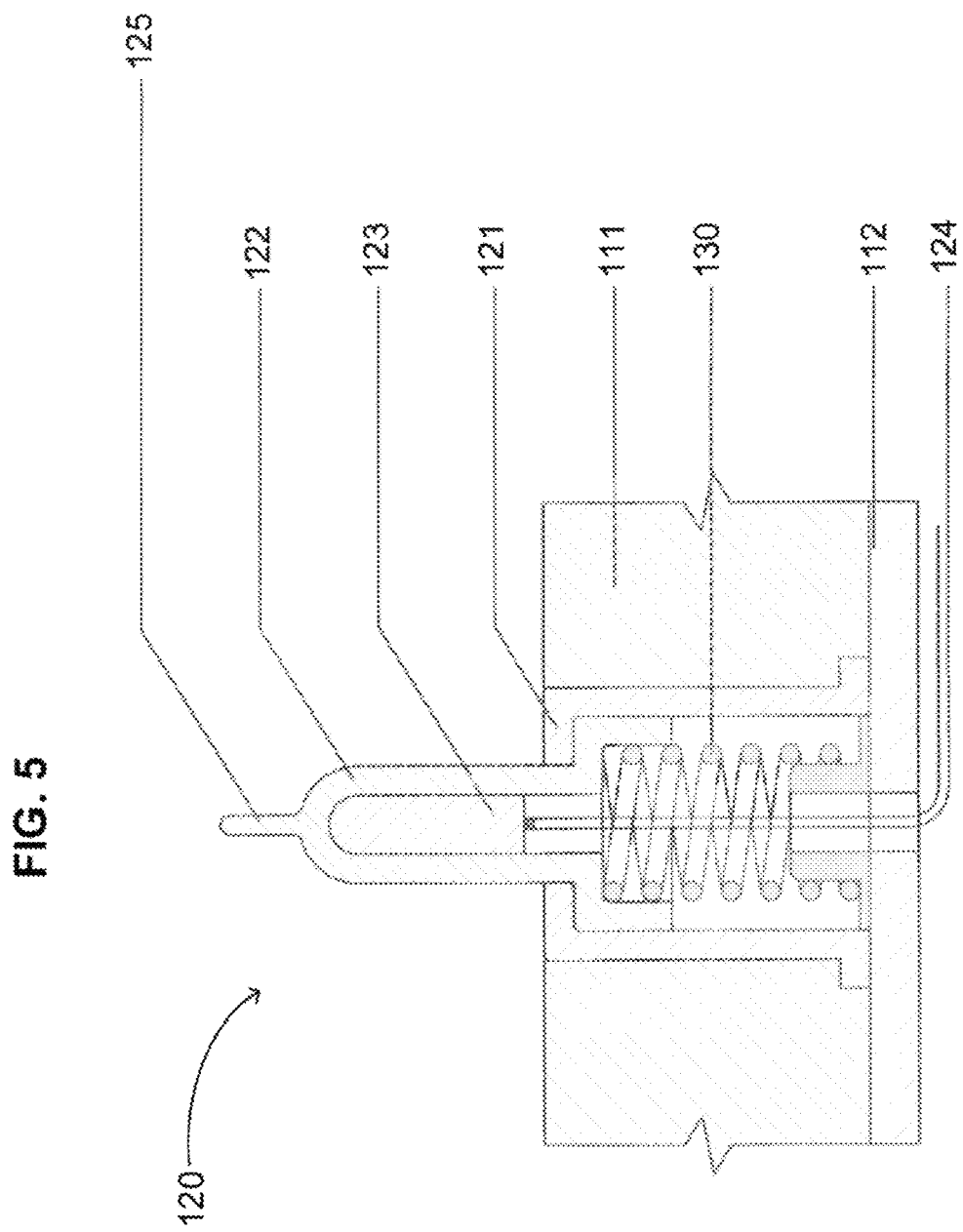
FIG. 5 illustrates a cross-sectional view of the projection of the apparatus of FIG. 4.

FIGS. 4 and 5 illustrate another embodiment of the apparatus 110 of the present invention including a main plate 111, base plate 112, an insulating sleeve 121 and at least one projection 120 having a generally cylindrical shape with a sharp tip 125 extending from the rounded end of the outer projection surface 122. As in the above embodiment, the projection 120 also includes a heating element 123 and wiring 124. A projection including a sharp tip 125 may be used for a variety of applications, and indeed may be preferred in some applications, particularly where, for example, a stronger and more secure welding may be needed. This is due to the combination of welding and perforation by projection 120. The sharp tip 125 may allow the projection 120 to puncture through the outside layer of wrapping material, such as the tail portion 85, to directly contact one or more underlying layers, and even optionally the baled item itself, and directly apply heat to each of the punctured layers, the immediate underlying layer not punctured (if any), and even the baled item itself. Such penetration welding may in some instances be more robust to provide increased strength to the wrapping material around the baled item.

Continuing with this embodiment, as illustrated in FIG. 5, the projection 120 may also include a spring 130, though a pressurized air cylinder or other mechanism may be used. For example, the combination of the sharp tip 125 with the spring 130 may provide the ability to control the depth that the projection projects into the tail portion, underlying layer or layers, and/or the baled item. Such depth control may be based on the type of wrapping material, the number of layers of material, the weight of the baled item, the type of baled item, the level of desired welding strength, or the like, or any combination thereof. The dimensions and properties of the spring, such as the compression strength, type of material and the like, may be adjusted to provide a desired height of the projection, a desired penetration depth by the sharp tip 125 into the wrapping material and/or baled item, or the like.

For example, in cases where the baled item is soft, like straw, hay or the like, such that the penetration welding would cause minimal if any damage, a projection with a sharp tip may be preferable. Such penetration welding for these types of baled items may also be useful as these soft baled items tend to also be compressible, and thus, may tend to exert a strong outward force on the wrapping material such that added shear may be imparted on the weld, and thus a stronger weld, with higher shear strength, between multiple layers of wrapping material would be beneficial. The spring 130 may be used to provide additional benefits to such a baled item, such as to account for any uneven surfaces of the wrapped baled item and to limit the depth of insertion through the wrapping material layers and into the baled item.

Alternatively, where penetration of the projection into the wrapping material and/or baled item is not necessary or is undesirable, the rounded tip of projection 20 (FIGS. 3A, 3B), or the like, may be used. The use of the rounded tip, without the sharp tip 125, may be used where the baled item is particularly flammable and thus direct heat from the projection is not desirable. Alternatively, baled items which are easily damaged, particularly from a puncture by the sharp tip, may also benefit from the use of projection 20, without a sharp tip.

Figure 6:
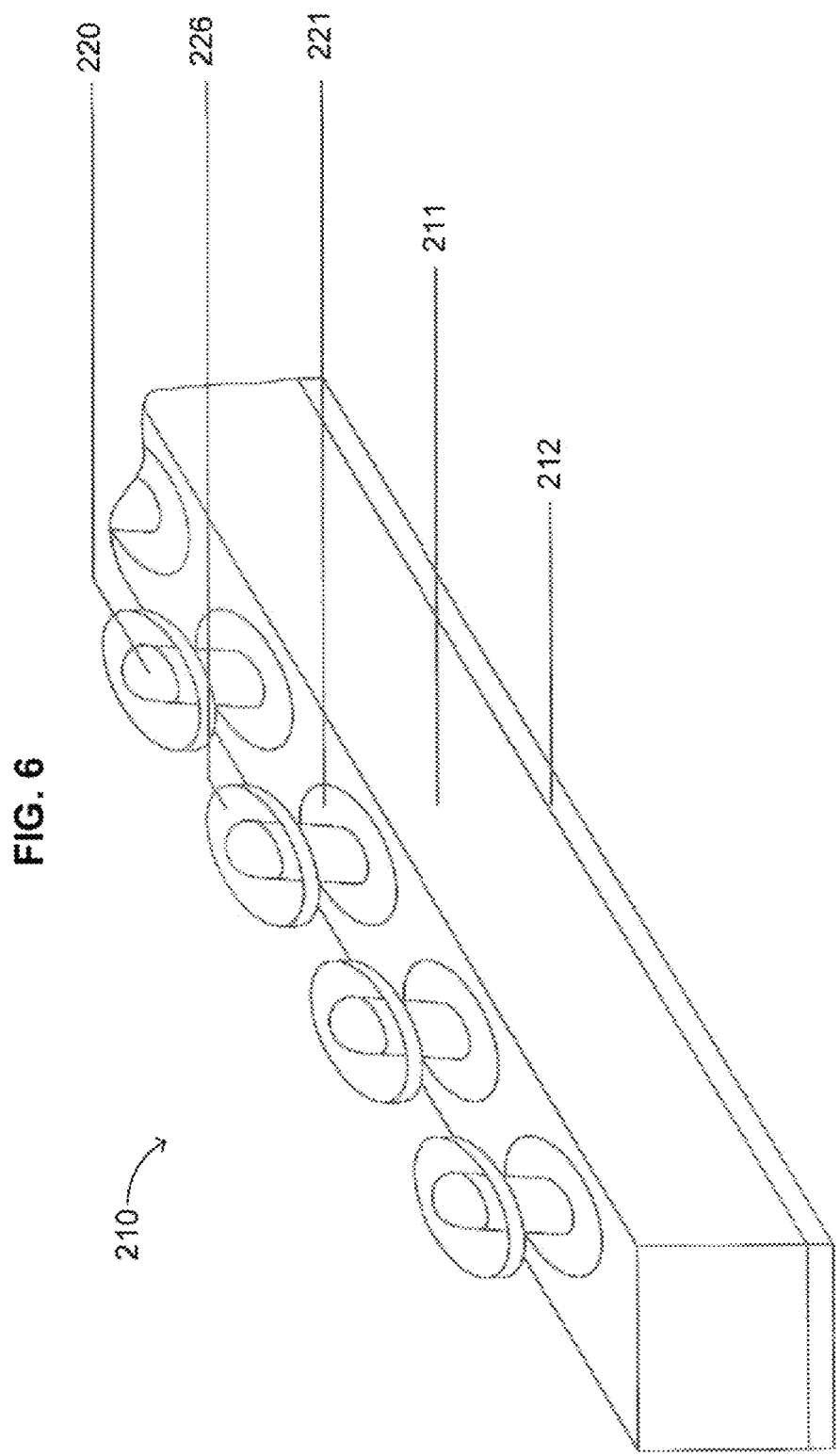
FIG. 6 illustrates a further embodiment of the apparatus of the present invention.

In yet another embodiment, as illustrated in FIG. 6, an apparatus 210 of the present invention includes a main plate 211, base plate 212, at least one projection 220 and an insulating sleeve 221 between each projection and the main plate. Each projection 220 also includes a stopper disc 226 positioned along the length of each projection. The stopper disc may, for example, limit movement of the projection into the main plate, or alternatively, limit the ingress of the projection into a depression formed by the projection into the wrapping material (typically where the baled item is particularly soft), or the like.

FIGS. 7A and 7B illustrate two configurations of projection 220, 220', similar to the projections 20, 20' of FIGS. 3A, 3B, except that both projections 220, 220' have a stopper disc 226, 226'. The stopper disc 226, 226' also may include a threaded portion 227, 227' to adjust the height of the stopper disc, and thus, the amount of the outer projection surface 222, 222' extending above the stopper disc 226, 226'. The stopper disc may be constructed from any material as desired, though it is preferred that the material have limited thermal conductivity, and thus be similar to the material of the insulating sleeve 221. The use of such material may allow for a more efficient apparatus in that the energy and heat remains concentrated on the projection itself, and not dispersed to other structures, such as the stopper disc material. As illustrated, FIGS. 7A and 7B differ between one (FIG. 7A) illustrating the use of a spring 230 and the other (FIG. 7B) illustrating the use of a pressurized air cylinder 230'. The discussions above as to these mechanisms apply here as well.

Figure 8:
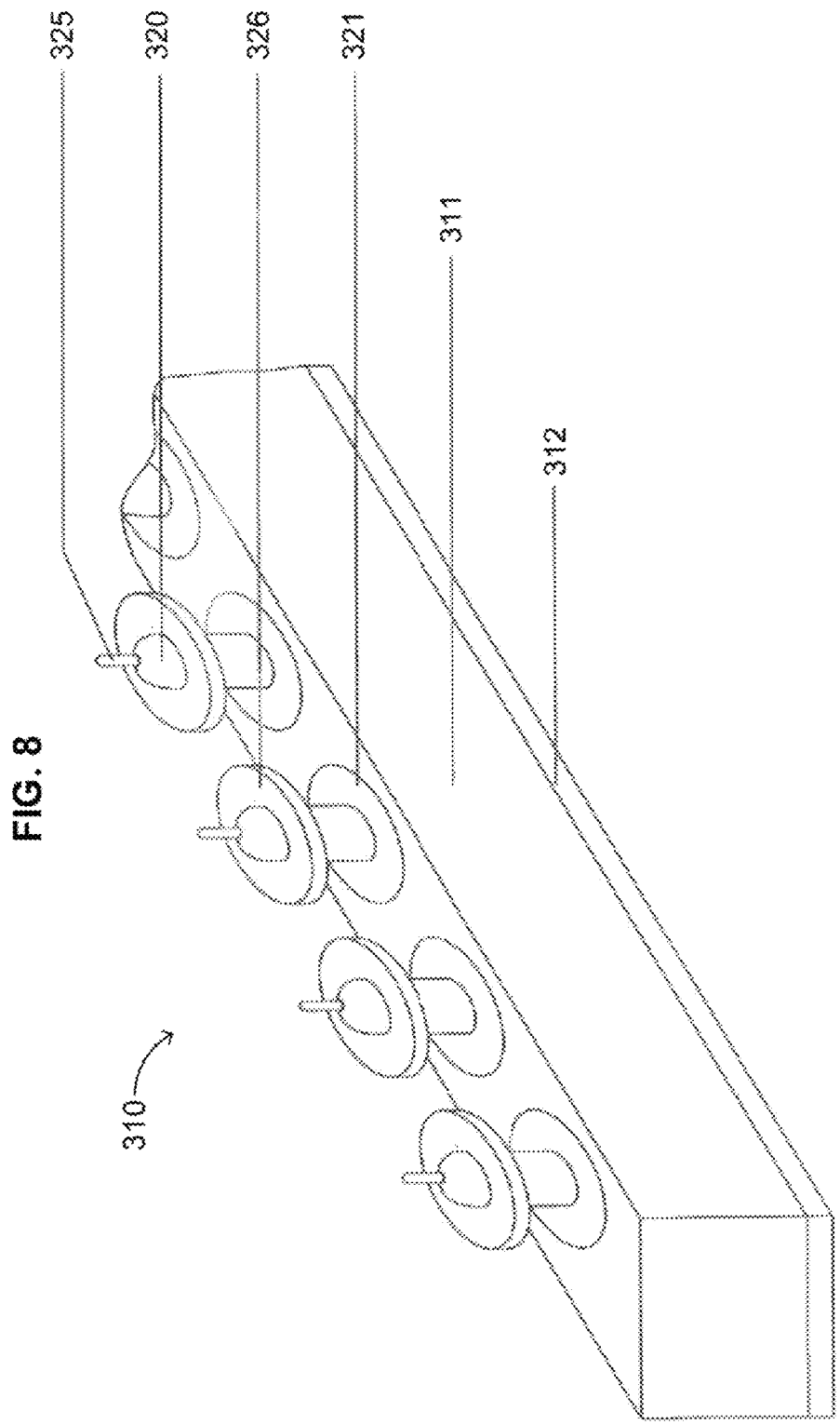
FIG. 8 illustrates yet another embodiment of the apparatus of the present invention.

Illustrated in FIGS. 8 and 9 is a further embodiment of the present invention, similar to the previous embodiments in many respects, though here the apparatus 310 includes at least one projection 320 having both a sharp tip 325 and a stopper disc 326. While projection 320 is illustrated as including a spring 330, a different mechanism, such as the pressurized air cylinder, discussed above, may be used instead.

When this embodiment is used, the stopper disc 326, in combination with the sharp tip 325, may serve to limit penetration of the sharp tip into the tail portion of the wrapping material, one or more underlying layers of material, and/or the baled item. This may be of particular importance and benefit when such a projection 320 is used with a baled item which may be negatively affected by the penetration of the sharp tip into the baled item, but benefits from the sharp tip 325 forming the perforated weld, as discussed above. Moreover, this embodiment may result in a more efficient process because the projection 320 has the benefit of, through perforation welding, directly contacting more layers of wrapping material than just the tail portion of the wrapping material, which results in greater efficiency in that multiple layers are heated and bonded at once. Also, this embodiment may minimize the contact of the sharp tip 325 with the baled item, which typically results in wasted energy and heat, and of course, could also result in damage to the baled item.

In still a further embodiment, as illustrated in FIGS. 10A and 10B, 11A and 11B, the present invention, similar to the previous embodiments in many respects, though here the apparatus 410, 410' has an at least one projection 420, 420' including a flattened tip 422, 422'. As opposed to the previously discussed projections, which include rounded and/or sharp tips, the apparatus 410, 410' may be used to create a substantially continuous weld line across the width of the wrapped baled item. Such a continuous weld line may result in a complete, substantially uninterrupted, weld across the width of the wrapped baled item as opposed to the various above embodiments which create concentrated and isolated welds at certain points along the width of the wrapped baled item. Such a welding configuration created by apparatus 410, 410' may be suitable for wrapped baled items which do not require an exceptionally strong weld, such as those welds formed by a projection with a sharp tip, and that has a smooth, even contour along the width of the wrapped baled item surface.

Figure 13:
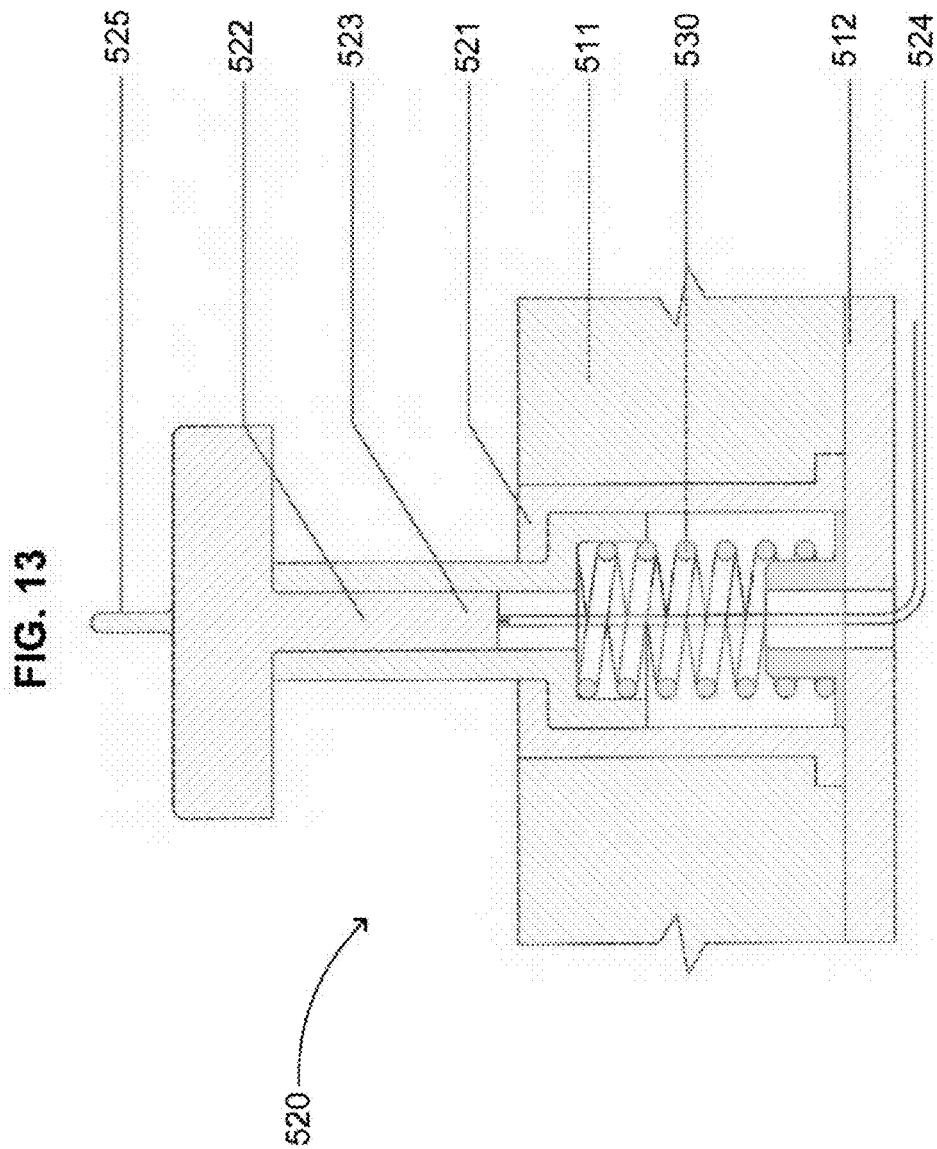
FIG. 13 illustrates a cross-sectional view of the projection of the apparatus of FIG. 12.

Similarly, as illustrated in FIGS. 12 and 13, another embodiment of the present invention includes an apparatus 510 having at least one projection 520 including a flattened tip 522, and further the projection includes a sharp tip 525 positioned on the flattened tip 522. While not illustrated, a stopper disc may also be positioned around the sharp tip 525 to limit the penetration of the sharp tip into the wrapped baled item. This embodiment provides a substantially continuous weld line across the width of the wrapped baled item, but provides the added benefit of a stronger weld using the sharp tip 525 to create a perforated weld. Such a configuration may be used, for example, for wrapped baled items that have a smooth, even contour along the width of the wrapped baled item surface, and could benefit from a stronger bond on the wrapping material. Also, this embodiment may be used with wrapped baled items where the baled item may not be harmed by the contact of the sharp tip directly on the baled item.

While multiple varying embodiments are illustrated and described herein, it is envisioned that other shapes, designs and configurations of projections of the apparatus are within the scope of the present invention. Further, the various elements including the sharp tip, rounded tip, flattened tip, spring, pressurized air cylinder, stopper disc and the like may be combined into any configuration desired or required. Furthermore, rather than each projection having its own designated spring, pressurized cylinder, or the like, the entire apparatus may have a single spring, pressurized cylinder, or the like, such that the entire apparatus can be moved to, for example, raise into contact with the wrapped baled item and lowered away from the wrapped baled item.

The present invention also includes various embodiments of methods of using the apparatus to secure a wrapping material around a wrapped baled item. Certain embodiments are illustrated, for example, in FIGS. 1, 14A, 14B and 15, utilizing certain embodiments of the apparatus. However, it should be understood that any envisioned embodiments of the apparatus may be used to perform the methods of the present invention and not just those illustrated or described.

In one embodiment, the method includes using the apparatus 10 to secure a wrapping material 80 to a baled item 70. In use, an item to be baled and wrapped is placed into a machine, as known in the art, to undergo the baling and wrapping processes, as are known in the art. At a point during or immediately follow the baling and wrapping processes, the wrapped baled item is placed onto the apparatus 10, which may be positioned within the chamber of the baling machine 90, as illustrated in FIG. 1. The placement of the wrapped baled item onto the apparatus is predetermined so that the fusing area, for example the tail portion 85 of the wrapping material 80, and the underlying layer or layers, are in contact with the at least one projection 20, 20' of the apparatus 10.

Typically, round baled items 70, which are wrapped with any known wrapped material 80, are usually prepared within a combined baling and wrapping machine 90. Once formed, they are rolled out of the chamber of the baling and wrapping machine directly to the ground or to any temporary station or storage facility. The apparatus of the present invention can be positioned to perform the welding step whether the bale rotates direct to the ground or rests temporarily on top of the apparatus. In the alternative where the bale rolls directly to the ground, a high temperature may be needed in order to weld the tail portion 85 to the underlying layer or layers as the baled item rolls and passes over the apparatus and to the ground. In such a case, the projections including a sharp tip (for example, as in FIGS. 4, 5, 8, 9, 12 and 13) on top of any welding projection shape (e.g., rounded, flattened, or the like) can also be used to accelerate welding. The temperature of the heating element 23 can be regulated to a constant temperature with or without a control signal (from a thermostat), or the like, such that the apparatus can accommodate a continuous stream of wrapped baled items exiting the baling machine 90. Alternatively, the temperature of the heating element 23 may be adjustable or variable as required using a control signal, or the like, from a thermostat or other device. For example, if the time between forming wrapped bales is long, the heating element of the projections may be turned on and off in order to save energy. The control signal to turn the heating elements on and off can come from the baling and wrapping machine (through the inclusion of an automated on/off switch, thermostat, thermocouple, or the like), the user (e.g., through manual control using a thermostat), or the like.

In the other alternative where the wrapped bale sits on top of the welding apparatus, and pauses prior to leaving the baling machine 90, a high temperature, and further a projection having a sharp tip, may not be required since the wrapped baled item may be positioned on the apparatus 10 for as long as is necessary to perform the welding process. Thus, in this alternative, a projection including a pressurized air cylinder may be used to move the projections into and out of a welding position. For example, the welding projections can be extended from the main plate and into contact with the wrapping material 80 (and specifically the tail portion 85) of a wrapped baled item for a certain period of time. Then, upon the passage of the certain period of time, the projections can be retracted back into the main plate and away from the wrapped baled item, at which point the wrapped baled item can continue out of the baling and wrapping machine 90. In an alternative embodiment, projections including springs may be used. Or, in another alternative embodiment, no adjustment mechanism may be used within the projections whatsoever, and instead, the entire apparatus 10 may move towards and away from the baled item. In either instance, e.g., using the pressurized air cylinder or spring, the projections can accommodate uneven surfaces of the baled item and still apply the appropriate amount of pressure to the wrapping material and/or baled item to perform the welding process, as is illustrated, for example, in FIGS. 14B and 15. Furthermore, in the instance of using the pressurized air cylinder, as in FIG. 15, the welding projections can be moved by an individual integrated cylinder, in each projection as illustrated, which can activate any welding projection up and down, or a single pressurized air cylinder can move all of the projections on the apparatus a desired distance to engage the baled item, either individually or together as a whole.

In any of the embodiments of the present invention, an important aspect of correctly operating the apparatus includes setting the welding projections to the desired temperature required to weld the tail portion 85 into the underlying layer or layers of the wrapping material 80. The temperature can be adjusted according to the period of time during which the wrapped item is positioned atop the apparatus. For example, the welding of a plastic film tail to the underlying layer can be achieved by setting the heating element of the projection to a temperature between 50 and 250 degrees Celsius for a period between 0.05 and 60 seconds. The range of desired temperature and period of time varies according to the type of the wrapping material used, the geometric shape of the heating projections and/or the main plate, the number of layers to be welded, or the like.

When the projection 120 having a sharp tip 125, as in FIG. 5, is used to weld the tail portion 85, such use of the sharp tip may result in an even stronger weld of the wrapping material 80 around the baled item 70. The benefit of using this projection is that the force per given area created by the sharp tip is many times higher than a projection having a flat or rounded tip (as in FIG. 3A or 10B, for example) due to the contact area of the sharp tip being significantly smaller in proportion to the diameter of the projection body, or alternatively, the flat or rounded tip of other projections used in the present invention. Further, due to the increased strength of the welding bond between the tail portion and at least the adjacent underlying layer, fewer revolutions of wrapping material may be required while still maintaining the weld and the integrity of the wrapped baled item. Essentially, the wrapping material 80 has a certain amount of friction against the baled item 70, as well as against adjacent layers of wrapping material, which reduces the force imparted on the weld at the tail portion. However, if the tail is firmly welded it will be able to retain this force even if the number of layers, and thereby the amount of friction, is reduced. Thus, such a strong weld as may be formed using the projections 120 having sharp tips 125 may be sufficient to counteract such forces associated with the tendency of the wrapped material 80 to expand, the tension created during the wrapping process, the tendency of the baled item 70 to expand, and other such forces.

Figure 15:
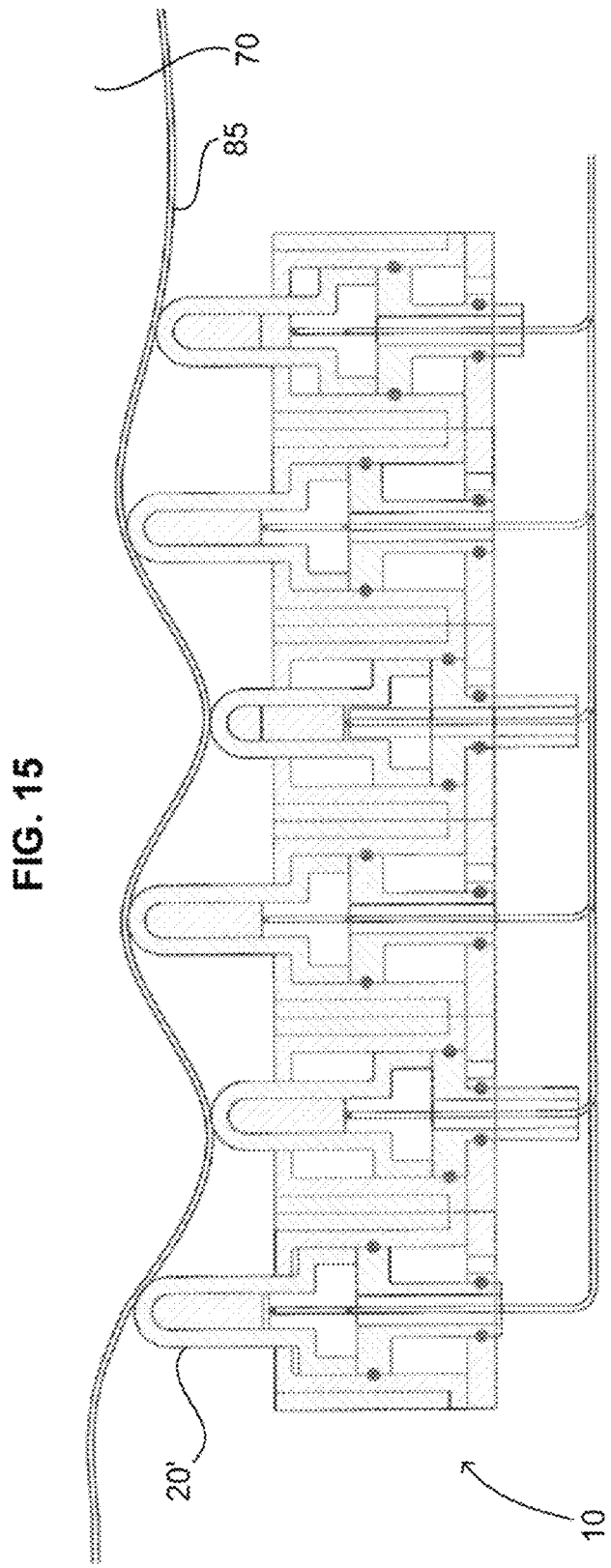
FIG. 15 illustrates the apparatus of FIGS. 2 and 3B engaging wrapping material around a baled item, wherein the wrapping material and baled item has an uneven surface.

As illustrated in FIGS. 1, 14B and 15, the wrapped baled item typically has an uneven outer surface (as in FIGS. 14B and 15) and further is typically soft (as in FIG. 1) because the agricultural product being baled is typically soft, compactable and has a low density, particularly as to products such as hay or straw, for example. Thus, unique problems arise when securing the wrapping material around such items. The apparatus 10, through the use of independent springs 30, pressurized air cylinders 30' (as illustrated), or the like, may allow for the adjustment of the height of each individual projection 20, 20', thereby enabling the proper welding of an uneven surface of a wrapped baled item, which is typical of many agricultural products and other baled items, and particularly so prior to final welding of the wrapping material surrounding such agricultural products. Allowing for height adjustment of the individual projections allows for welding of sunken or depressed areas of the surface of the wrapping material as well as protruded areas to ensure adequate welding is performed along the width of the wrapped baled item. Such welding of uneven surfaces is illustrated in FIGS. 14B and 15.

Likewise, the height adjustment mechanisms of the projections of the apparatus of the present invention allow for better welding of such baled items which are soft or compressible. For example, in one embodiment, the height adjustment mechanism allows the projection, having a sharp tip, to move as the wrapped baled item moves on top of the apparatus. This movement of the projection minimizes the puncture depth of the projection, which otherwise would puncture deep into the baled item, while maintaining beneficial contact with the wrapping material. Such movement may provide for a better weld and more efficient welding process. Similarly, in another example, allowing a projection, which has a rounded or flattened tip, to retract into the main plate as the baled item moves on top of the apparatus minimizes the compression applied to the portion of the baled item and wrapping material on top of the projection which may result in damage to the soft baled item, an undesirable weld due to the deformation of the wrapping material and the baled item, or the like. Additionally, the stopper discs may provide further assistance in achieving a proper weld of the wrapping material by providing a larger surface area against which the wrapping material rests. For example, as the wrapped baled item positions atop the apparatus, the projections retract towards the main plate, and at a certain point the stopper disc engages the outer layer, or tail portion, of the wrapping material. At this point, the stopper discs may form a larger surface area on which the wrapping material and baled item rests, which may assist in smoothing the wrapping material and providing a more even surface on which to perform the weld.

Thus, the apparatus and methods of the present invention resolve the difficulties of welding two or more layers of wrapping material to one another where the surface against which the welding is to occur, e.g., the baled item, is soft, uneven and provides little counterforce, or an uneven counterforce, against the force of the welding projections contacting the wrapping material.

Of course, the present invention also includes embodiments where the projections do not include a spring, compressed air cylinder, or like height adjustment mechanism. In such embodiments, the projections may be longer, and may include sharp tips, to ensure connection of the projections to the surface of the wrapping material, even if the surface of the wrapping material is uneven. However, such embodiments may result is less efficient and less reliable heating of the wrapping material due to some projections projecting deep into the wrapping material layers and baled item while others may merely pierce a portion of the wrapping material layers, merely contact the surface of the tail portion, or fail to contact the wrapping material altogether.

The apparatus of the present invention provides for bonding between the tail portion and at least one underlying layer of the wrapping material at a molecular level, and thus provides for a strong bond with little chance of failure, even in the presence of rain, dust, wind or other environmental occurrences. Such bonding may be performed, using the apparatus of the present invention, on any type of wrapping material suitable for and capable of thermal melting or bonding through the application of energy such as heat. For example, wrapping materials may be polymeric film, netting, breathable films, or the like. Also, combination wrapping materials may also be used, such as a breathable film combined with a typical netting, as is known in the art, such that the film forms the weld while the netting provides structural strength to the wrapping material.

A secondary adhesive, applied to the tail portion, may also be used in conjunction with the present invention, though such adhesive would likely be redundant in light of the strong welding properties of the use of the apparatus of the present invention.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for securing a wrapping material around an item, wherein the wrapping material has a leading end and a following end, the following end having a tail portion, wherein the wrapping material wraps around the item with at least one complete revolution forming at least one underlying layer such that the tail portion of the wrapping material overlaps the underlying layer, the apparatus comprising:

a main plate positioned on a surface; and
a plurality of projections extending from the main plate, each of the plurality of projections including a heating element and an independent height adjustment mechanism, wherein the independent height adjustment mechanism for a given projection controls a force applied to the wrapping material by the projection and provides a force for moving the projection from the main plate towards the item, and wherein the heating element is configured to weld the tail portion to the underlying layer by transferring heat to the tail portion,
wherein the apparatus is configured such that the tail portion of the item is welded by the heating elements of the plurality of projections as the item rolls on the surface over the main plate.

2. The apparatus of claim 1, wherein the independent height adjustment mechanism is a spring or a pressurized air cylinder.

3. The apparatus of claim 2, wherein the independent height adjustment mechanism is a pressurized air cylinder, and the pressurized air cylinder includes a piston adapted to adjust the height of the projection relative to the main plate.

4. The apparatus of claim 1, wherein the projection further includes a sharp tip.

5. The apparatus of claim 4, wherein the height adjustment mechanism is capable of adjusting a force applied to the wrapping material by the sharp tip, such that the independent height adjustment mechanism is capable of adjusting a depth of penetration of the projection into the wrapping material, item, or both.

6. The apparatus of claim 1, wherein the projection further includes a stopper disc.

7. The apparatus of claim 6, wherein the stopper disc is constructed of a material having limited thermal conductivity.

8. The apparatus of claim 6, wherein the stopper disc includes a moveable engagement with the projection adapted to adjust the height of the stopper disc relative to the height of the projection.

9. The apparatus of claim 1, wherein the length of the main plate is substantially equal to or greater than a width of the wrapping material.

10. The apparatus of claim 1, wherein the plurality of projections are at least partially within the main plate.

11. The apparatus of claim 1, wherein the apparatus is configured to weld the tail portion of the wrapping material as the item stops atop the main plate with the tail portion positioned adjacent the apparatus.

12. A method of securing a wrapping material around a baled item, comprising:

baling an item using a baling machine;
wrapping the baled item with a wrapping material having a leading end and a following end, the following end having a tail portion, wherein the wrapping material wraps around the baled item with at least one complete revolution forming at least one underlying layer such that the tail portion of the wrapping material overlaps the underlying layer;
contacting the tail portion with an apparatus, the apparatus comprising a main plate positioned on a surface and a plurality of projections extending from the main plate, each projection including a heating element and an independent height adjustment mechanism, the height adjustment mechanism for a given projection controlling a force applied to the wrapping material by the projection and providing a force that moves the projection from the main plate towards the item;

welding the tail portion to the underlying layer by transferring heat to the tail portion from the heating elements of the plurality of projections to form a welded wrapped baled item, wherein the baled item passes over the main plate and the plurality of projections as the baled item rolls and as the tail portion of the wrapping material is welded to the underlying layer; and removing the welded wrapped baled item from the baling machine.

13. The method of claim 12, wherein the baled item and wrapping material moves continuously through the baling machine, over the main plate of the apparatus and out of the baling machine without stopping.

14. The method of claim 12, wherein the baled item and wrapping material stops atop the main plate of the apparatus such that the tail portion is positioned adjacent the apparatus.

15. The method of claim 12, wherein the baled item and wrapping material includes an uneven surface, such that the height adjustment mechanism of each projection positions each projection into contact with the uneven surface of the wrapping material and controls the force applied by each projection to the wrapping material.

16. The method of claim 12, wherein the projection includes a sharp tip such that the projection punctures through the tail portion and directly engages the underlying layer.

17. The method of claim 16, wherein the wrapping material wraps around the baled item two or more complete revolutions forming two or more underlying layers, the projection punctures through the tail portion and each of the underlying layers, thereby welding each of the underlying layers and tail portion to one another.

18. The method of claim 17, wherein the height adjustment mechanism of a given projection is capable of adjusting the depth of penetration of the projection such that the height adjustment mechanism limits a depth to which the projection punctures through the wrapping material, the baled item or both.

19. The method of claim 18, wherein the height adjustment mechanism controls the projection to puncture through the tail portion and underlying layers of the wrapping material but prevents contact between the projection and the baled item.

20. The method of claim 12, wherein the wrapping material is polymeric film.

21. The method of claim 12, wherein the plurality of projections are at least partially within the main plate.

* * * * *